(12) United States Patent
Li et al.

(10) Patent No.: US 12,078,559 B2
(45) Date of Patent: Sep. 3, 2024

(54) PRESSURE SENSING ASSEMBLY AND METHOD WITH INCREASED PRECISION AND RELIABILITY

(71) Applicant: SHENZHEN NEW DEGREE TECHNOLOGY CO., LTD., Guangdong (CN)

(72) Inventors: Hao Li, Guangdong (CN); Xuepeng Lin, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 305 days.

(21) Appl. No.: 17/682,982

(22) Filed: Feb. 28, 2022

(65) Prior Publication Data
US 2022/0178776 A1  Jun. 9, 2022

Related U.S. Application Data

(63) Continuation-in-part of application No. PCT/CN2019/103865, filed on Aug. 30, 2019.

(51) Int. Cl.
*G01L 1/22* (2006.01)
(52) U.S. Cl.
CPC .................. *G01L 1/2293* (2013.01)
(58) Field of Classification Search
None
See application file for complete search history.

(56) References Cited

U.S. PATENT DOCUMENTS 5,035,148 A * 7/1991 Okada .................. G01L 1/18
338/5
10,185,428 B2 * 1/2019 Li ........................ G01L 1/146
10,386,952 B2 * 8/2019 Li ...................... G06F 3/04142

FOREIGN PATENT DOCUMENTS

| CN | 104995587 | 10/2015 |
| CN | 106643463 | 5/2017 |
| CN | 206828092 | 1/2018 |
| CN | 107924243 | 4/2018 |
| CN | 108204870 | 6/2018 |
| CN | 208653681 | 3/2019 |
| EP | 0 227 850 | 7/1987 |

OTHER PUBLICATIONS

International Search Report for PCT/CN2019/103865 with Translation mailed May 28, 2020, 7 pages.

* cited by examiner

*Primary Examiner* — Brandi N Hopkins
*Assistant Examiner* — Nigel H Plumb
(74) *Attorney, Agent, or Firm* — Nixon & Vanderhye, P.C.

(57) ABSTRACT

A pressure sensing assembly, a pressure sensing method, and a device having the pressure sensing assembly are disclosed. The detection circuit and the signal generating circuit are connected to a signal processing circuit, the detection circuit includes a first bridge circuit constituted by connecting at least four force sensors R1, R2, R3 and R4. During use, the rigid structure is attached on an object to be detected which is deformed under action of an acting force, the detection circuit and the signal generating circuit are cooperated so as to generate different output signals that pass through the signal processing circuit, so that a direction and a magnitude of the acting force is recognized. The pressure sensing assembly has an integrated structure, is prone to be assembled, has a simple circuit configuration, and is low in cost.

20 Claims, 5 Drawing Sheets

PRESSURE SENSING ASSEMBLY AND METHOD WITH INCREASED PRECISION AND RELIABILITY

CROSS-REFERENCE TO RELATED APPLICATIONS

This application is a continuation-in-part of PCT international patent application Serial No. PCT/CN2019/103865, filed on Aug. 30, 2019, the entire contents of which are incorporated herein by reference for all purposes.

TECHNICAL FIELD

The present disclosure relates to the technical field of pressure sensing technology, and particularly relates to a pressure sensing assembly, a pressure sensing method that applies the pressure sensing assembly, and a pressure detection device having the pressure sensing assembly.

BACKGROUND

Pressure detection technology has been widely used in various fields, in addition to traditional physical parameters such as air pressure, water pressure, gravity and the like, the pressure sensing assembly is arranged in various electronic devices, so that the level and the user experience of human-computer interaction are enriched, and more strict requirements are required on the performance of the pressuring sensing component such as size, sensitivity, noise level, precise recognition of the position to be pressed, and the reliability of the pressure sensing assembly.

The current commonly used pressure detection technologies include different types of technologies such as resistive strain gauge technology, pressure capacitance technology, pressure inductance technology, piezoelectric ceramic technology, micro electro mechanical system (micro electro mechanical system, MEMS) pressure sensor technology, and the like. For example, the pressure capacitance technology and the pressure inductance technology are used to detect the capacitance or inductance between two opposite surfaces, thus, there is a very high requirement on assembly accuracy, structure and space, and anti-drop coefficient is low; the piezoelectric ceramic technology is implemented by striking the piezoelectric ceramics and detecting voltage change of the piezoelectric ceramics, thus, the piezoelectric ceramic technology has certain requirement on installation environment, and is not suitable for some places where weak strain needs to be detected; with respect to the resistance strain gauge technology, it needs to select sensors having equivalent resistance values, and then arrange these sensors on a specific structure, so that a large space is required, and the sensitivity is low. The MEMS pressure sensor technology is implemented by pressing the MEMS so as to make the resistances of the internal sensors to be changed, thereby detecting a certain degree of pressure in the MEMS, since the MEMS itself is relatively fragile, and has serious defects in some aspects such as anti-drop coefficient, consistency, and the like. A defect that commonly exists in these technologies is that the requirement on assembling of the structure is high, and it can only detect deformation in one-dimensional direction, so that when the pressure sensing assembly is pressed from another dimension, pressure acted on the pressure sensing assembly may be decomposed to the dimension that needs to be detected, so that a false recognition is caused, and a reliability of a pressure detection device is seriously affected.

SUMMARY OF EXAMPLE EMBODIMENTS

One objective of the embodiments of the present disclosure is providing a pressure sensing assembly, a pressure sensing method, and a device having the pressure sensing assembly, which aims at solving a technical problem that a requirement of assembling of the conventional pressure sensing assembly is high, and it can only detect a deformation in one-dimensional direction.

The technical solutions adopted in the embodiments of the present disclosure are described below:
in the first aspect, a pressure sensing assembly is provided, the pressure sensing assembly includes:
a rigid structure configured to be attached with an object to be detected and be deformed with deformation of the object to be detected, the rigid structure comprises a plurality of rigid blocks arranged at intervals along a X axis and a plurality of strain amplifying regions, where one strain amplifying region of the plurality of strain amplifying regions is formed between every two adjacent rigid blocks of the plurality of rigid blocks, and the rigid structure has four mounting surfaces;
a detection circuit which includes a first bridge circuit constituted by connecting at least four force sensors, where two groups of opposite bridge arms in the first bridge circuit are respectively arranged on two opposite mounting surfaces of the four mounting surfaces, and two force sensors are respectively arranged on two opposite mounting surfaces of the strain amplifying region; and
a signal generating circuit configured to cooperate with the detection circuit so as to generate different output signals when the rigid structure is stressed and deformed, wherein the detection circuit and the signal generating circuit are electrically connected with a signal processing circuit to recognize a direction and a magnitude of an acting force.

In the second aspect, a pressure sensing method applied to the pressure sensing assembly is provided, the pressure sensing method includes following steps:
attaching the rigid structure on an object to be detected;
electrically connecting the first bridge circuit and the second bridge circuit to the signal processing circuit, and detecting a direction and a magnitude of an acting force by detecting signal changes of the first bridge circuit and the second bridge circuit, when the signal generating circuit is the second bridge circuit; or
electrically connecting the first bridge circuit, the second bridge circuit, the first single bridge and the second single bridge to the signal processing circuit; or
recognizing the direction and the magnitude of the acting force by detecting signal changes of the first bridge circuit, the second bridge circuit, the first single bridge and the second single bridge, when the signal generating circuit comprises the second bridge circuit and the second single bridge; or
electrically connecting the first bridge circuit and the first single bridge to the signal processing circuit to recognize a direction and a magnitude of the acting force by detecting the variations of the signals of the first bridge circuit and the first single bridge, when the signal generating circuit is the path of fixed voltage.

In the third aspect, a pressure detection device is provided, the pressure detection device includes the aforesaid pressure sensing assembly.

BRIEF DESCRIPTION OF DRAWINGS

In order to describe the embodiments of the present disclosure more clearly, a brief introduction regarding the accompanying drawings that need to be used for describing the embodiments of the present disclosure or demonstrated technology is given below; it is obvious that the accompanying drawings described below are only some embodiments of the present disclosure, a person of ordinary skill in the art may also obtain other drawings according to these drawings without paying creative labor.

DESCRIPTION OF EMBODIMENTS

Figure 1:
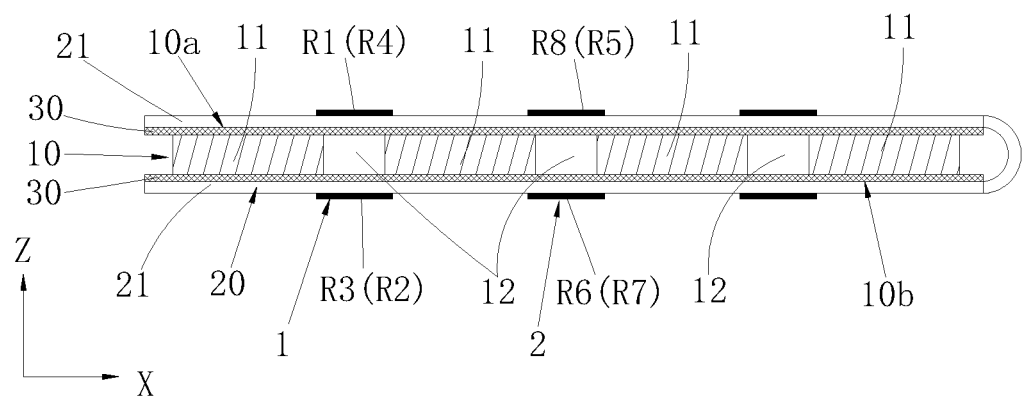
FIG. 1 is a schematic diagram of an assembled pressure sensing assembly according to one embodiment of the present disclosure.

In the description of the present disclosure, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present disclosure conveniently and simplify the description, but not to indicate or imply that an indicated device or component must have specific locations or be constructed and manipulated according to specific locations; therefore, these terms shouldn't be considered as any limitation to the present disclosure.

In addition, terms "the first" and "the second" are only used for description purposes, and should not be considered as indicating or implying any relative importance, or implicitly indicating the number of indicated technical features. As such, technical feature(s) restricted by "the first" or "the second" can explicitly or implicitly comprise one or more such technical feature(s). In the description of the present disclosure, "a plurality of" means two or more, unless there is additional explicit and specific limitation.

In the present disclosure, unless there is additional explicit stipulation and limitation, terms such as "mount", "connect with each other", "connect", "fix", and so on should be generalizedly interpreted, for example, "connect" may be interpreted as being fixedly connected, detachably connected, or connected integrally; "connect" can also be interpreted as being mechanically connected or electrically connected; "connect" may be further interpreted as being directly connected or indirectly connected through intermediary, or being internal communication between two components or an interaction relationship between the two components. For the person of ordinary skill in the art, the specific meanings of the aforementioned terms in the present disclosure may be interpreted according to specific conditions.

In order to describe the technical solutions of the present disclosure, the technical solutions of the present application are described with reference to the accompany figures and the embodiments below.

A pressure sensing assembly is provided in some embodiments of the present disclosure, with reference to FIGS. 1-4, the pressure sensing assembly includes a rigid structure 10 and a detection circuit 1, and a signal generating circuit 2. The rigid structure is used to be attached to an object (not shown) to be measured and is deformed with the deformation of the object to be detected, the rigid structure 10 includes a plurality of rigid blocks 11 arranged at intervals along a X axis and a plurality of strain amplifying regions 12, where one strain amplifying region 12 is formed between every two adjacent rigid blocks 11 of the plurality of rigid blocks 11, and the rigid structure 10 forms four mounting surfaces around the X axis. The detection circuit 1 includes a first bridge circuit constituted by connecting at least four force sensors R1, R2, R3 and R4, where two groups of opposite bridge arms R1, R4 and bridge arms R2, R3 in the first bridge circuit are respectively arranged on two opposite mounting surfaces 10$a$, 10$b$, and two force sensors R1 and R2 are respectively arranged on two opposite mounting surfaces 10$a$, 10$b$ of the strain amplifying region 12. The signal generating circuit 2 is configured to cooperate with the detection circuit 1 so as to generate different output signals when the rigid structure 10 is stressed and deformed, and the detection circuit 1 and the signal generating circuit 2 are electrically connected to the signal processing circuit so as to recognize a direction and a magnitude of an acting force.

During use, the rigid structure 10 is attached on the object to be detected, the object to be detected is stressed and deformed, the rigid structure 10 is deformed with the deformation of the object to be detected, a strain of the rigid structure 10 is concentrated in the strain amplifying region 12, the force sensors at the strain amplifying region 12 obtain a pressure signal, the detection circuit 1 cooperates with the signal generating circuit 2 to generate different output signals, the output signals passes through the signal processing circuit so as to recognize the direction and the magnitude of the acting force. The pressure sensing assembly has an integrated structure, and is prone to be assembled, has a simple circuit diagram and is low in cost. According to the pressure sensing assembly, the pressure sensing method and the device having the pressure sensing assembly, tiny deformations of the object to be detected in multi-dimensional directions can be detected very sensitively, so that the pressures acted on the object to be detected and from various directions can be accurately recognized, the reliability and the stability of the pressure sensing assembly are improved.

It should be noted that the signal processing circuit is electrically connected with the bridge circuit and the single bridge, and is configured to perform analysis and processing on electrical signals of the force sensors, and convert a force analog signal into a force digital signal, this part of features disclosed above belongs to the prior art.

In one embodiment, the rigid structure 10 is rigid in the structure, and the strain amplifying region 12 is a hollowed region. When an acting force is acted on the object to be detected, the rigid structure 10 deforms with the deformation of the object to be detected, the deformation of the strain amplifying region 12 is amplified, the deformations of the force sensors arranged in the strain amplifying region 12 are amplified, so that the first bridge circuit is enabled to detect the deformation of the rigid structure 10. In particular, the rigid structure 10 may be a steel sheet, an aluminum sheet, a glass sheet, an epoxide woven glass fabric laminated sheet or other composite rigid material, and may be selected as required.

In one embodiment, flexible substrates 21 are provided on the mounting surfaces which are provided with the force sensors R1, R2, R3 and R4, the force sensors R1 R2, R3, R4 are respectively arranged on the flexible substrates 21 respectively, the flexible substrates adhered with the force sensors R1 (R2, R3, R4) are respectively pressed on the discrete rigid blocks 11 with a certain size through a colloid 30, some force sensors are arranged to be directly facing or adjacent to the strain amplifying region 12, and some force sensors are directly facing the rigid block 11, thereby forming the pressure sensing assembly, the structure of the pressure sensing assembly is prone to be molded. In particular, the flexible substrate 21 may be a flexible circuit board (flexible circuit board, FCB), a polyethylene terephthalate (polyethylene terephthalate, PET), a polyimide film (polyimide film, PF), or other flexible substrate 21 with better flatness, the flexible substrate 21 is selected as required.

In one embodiment, all of the flexible substrates 21 are constituted by bending one base substrate 20. The force sensors R1 R2, R3, R4 are attached on one base substrate 20, then, a center of the base substrate 20 is folded over and then the inner surface of the base substrate 20 is bonded to the various mounting surfaces, the processing is simple, and the cost is low.

In one embodiment, the flexible substrates 21 are bonded with the mounting surfaces according to the colloid 30. The structure facilitates the connection between the rigid structure 10 and the flexible substrates 21, and enables the flexible substrates 21 and the rigid structure 10 to be deformed with the deformation of the object to be detected when the object to be detected is deformed under the action of the acting force. The colloid 30 may be a material such as epoxy adhesive film, 502 glue, thermosetting adhesive, silica gel, and the like.

In one embodiment, the force sensors R1 R2, R3, R4 are strain sensing force sensors, and the strain sensing force sensors are made of at least one material from a group consisting of polycrystalline semiconductor material, amorphous semiconductor material, polysilicon, graphene, copper-nickel alloy, carbon nanotube, metal thin wire, and conductive insulator composite material. Each of the aforesaid solutions can realize pressure sensing, the material of the strain sensing force sensors is selected as needed.

There are three circuit arrangements between the detection circuit 1 and the signal generating circuit 2, and the three circuit arrangements allow the signal generating circuit 2 to cooperate with the detection circuit 1 to generate different output signals when the rigid structure 10 is stressed and deformed, and the output signals are input into the signal processing circuit, so that the direction and the magnitude of the acting force is recognized, one of the three circuit arrangements can be selected.

Figure 11:
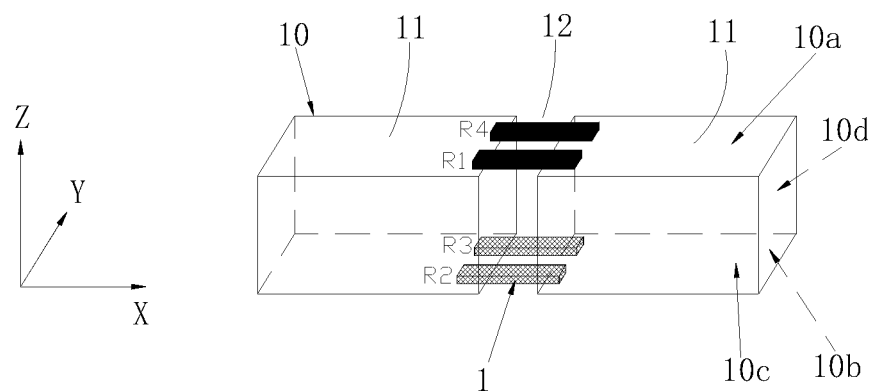
FIG. 11 is a three-dimensional structural diagram of the pressure sensing assembly according to one embodiment of the present disclosure.
Figure 12:
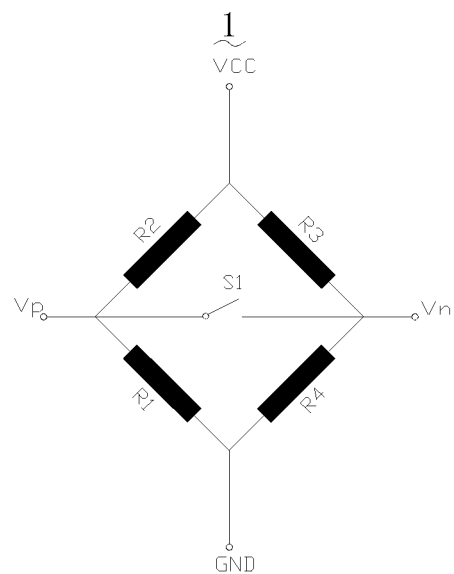
FIG. 12 is a circuit diagram of a bridge circuit according to one embodiment of the present disclosure.

Regarding the first circuit arrangement, with reference to FIGS. 3-9, the signal generating circuit 2 is the second bridge circuit constituted by connecting at least four force sensors R5, R6, R7 and R8, and two opposite bridge arms R5 and R8 or bridge arms R6 and R7 in the second bridge circuit are respectively arranged on two opposite mounting surfaces; the first bridge circuit and the second bridge circuit can generate different output signals when the rigid structure 10 is stressed and deformed;

Regarding the second circuit arrangement, with reference to FIG. 3, and FIGS. 5-10, the detection circuit 1 further includes a first single bridge Vp3 constituted by connecting two detection terminals Vp1 and Vn1 of the first bridge circuit, that is, resistor R1 and resistor R3 are connected in parallel, resistor R2 and resistor R4 are connected in parallel, and then the force sensors R1, R3 and the force sensors R2, R4 are connected in series to constitute the first single bridge Vp3, and a potential of the first single bridge Vp3 is served as an output signal; the signal generating circuit 2 includes a second bridge circuit constituted by connecting at least four force sensors, and a second single bridge Vn3 constituted by connecting two detection terminals Vp2 and Vn2 of the second bridge circuit, that is, force sensors R5 and R7 are connected in parallel, force sensors R6 and R8 are connected in parallel, then, force sensors R5 and R7 and force sensors R6 and R8 are connected in series to constitute a second single bridge Vn3, and a potential of the second single bridge Vn3 is served as an output signal; two opposite bridge arms R5, R8 and bridge arms R6, R7 in the second bridge circuit are respectively arranged on two opposite mounting surfaces; when the rigid structure 10 is stressed and deformed, the first bridge circuit, the second bridge circuit, the first single bridge Vp3 and the second single bridge Vn3 can generate different output signals;

Regarding the third circuit arrangement, with reference to FIG. 11 and FIG. 12, the detection circuit 1 further includes the first single bridge Vp3 constituted by connecting two detection terminals Vp1 and Vn1 of the first bridge circuit, that is, force sensors R1 and R3 are connected in parallel, force sensors R2 and R4 are connected in parallel, then, force sensors R1, R3 and force sensors R2, R4 are connected in series to constitute the first single bridge Vp3, the potential of the first single bridge Vp3 is served as an output signal; the signal generating circuit is a path of fixed voltage, the first single bridge Vp3 and the fixed voltage constitute a differential pair; when the rigid structure 10 is stressed and deformed, the first bridge circuit and the first single bridge Vp3 can generate different output signals.

Figure 10:
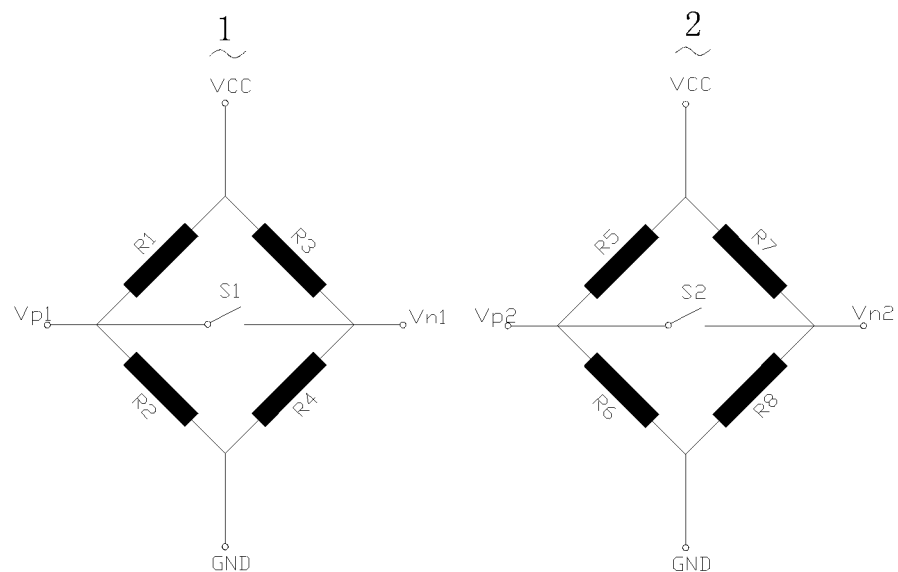
FIG. 10 is a circuit diagram of a bridge circuit according to another embodiment of the present disclosure.

In one embodiment, when the second circuit arrangement in FIG. 10 or the third circuit arrangement in FIG. 12 is used, the two detection terminals VP1 and Vn1 of the first bridge circuit are connected through an analog switch S1; and the two detection terminals Vp2 and Vn2 of the second bridge circuit are connected through an analog switch S2. In this way, the first bridge circuit and the second bridge circuit can be conveniently switched to a bridge circuit or a single bridge. In particular, an analog switch with the model of TS3A4751 can be selected as a single-pole single-throw analog switch, this switch is a 2-way, 4-channels, normally open single-pole single-throw (single-pole single-throw, SPST) analog switch, and this analog switch may be used to connect two detection terminals Vp1 and Vn1 of the first bridge circuit to constitute the first single bridge Vp3, and may also be used to connect two detection terminals Vp2 and Vn2 of the second bridge circuit to constitute the second single bridge Vn3, and control switching between the bridge circuit and the single bridge.

Figure 2:
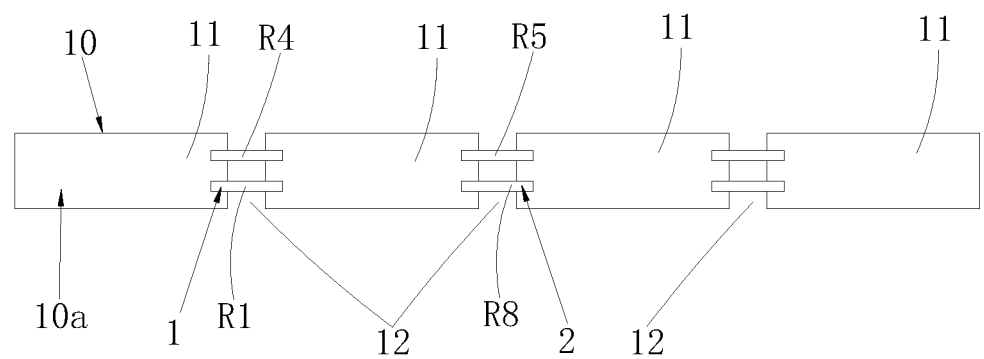
FIG. 2 is a bottom view of the pressure sensing assembly in FIG. 1.
Figure 3:
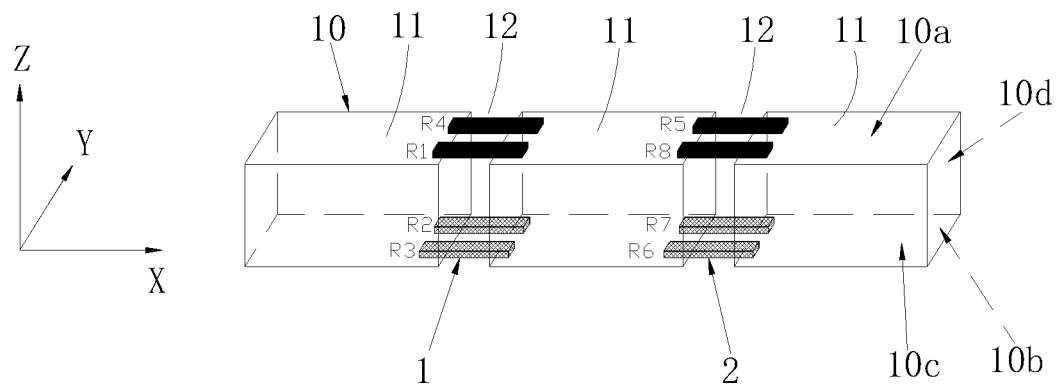
FIG. 3 is a three-dimensional structural diagram of the pressure sensing assembly in FIG. 2.

In one embodiment, with reference to FIGS. 1-3, length directions of the force sensors R1-R8 is parallel to the X axis; according to this structure, the force sensors are prone to be assembled, the amounts of deformations of the force sensors are greater when the object to be detected is pressed, and pressure signals can be better output. The four mounting surfaces are classified into a first surface 10A and a second surface 10b distributed at intervals on the Z-axis, and a third surface 10C and a fourth surface 10D distributed at intervals on the Y-axis, where the first surface 10A is served as a fitting surface of the object to be detected, the X-axis, the Y-axis and the Z-axis are perpendicular to each other. According to this structure, the force sensors are prone to be assembled, and the force sensors are used to detect acting forces in different directions. In particular, both the first surface 10A and the second surface 10b of the rigid structure 10 are parallel to XY plane, both the third surface 10C and the fourth surface 10D are parallel to XZ plane.

In one embodiment, force sensors are arranged on mounting surfaces of one or more strain amplifying regions 12 to constitute the first bridge circuit, thereby detecting a pressure corresponding to the strain amplifying region 12. The number of strain amplifying regions 12 of the force sensors is set according to the size of pressure sensing region.

When the first circuit arrangement is adopted, with reference to FIGS. 3-9, the first bridge circuit and the second bridge circuit are arranged, there are multiple arrangements for the force sensors of the first bridge circuit and the second bridge circuit, a common characteristic is that two groups of opposite bridge arms R1, R4 and bridge arms R2, R3 in the first bridge circuit are respectively arranged on two opposite mounting surfaces, and the two opposite bridge arms R5, R8 and bridge arms R6, R7 in the second bridge circuit are respectively arranged on the two opposite mounting surfaces.

When the first circuit arrangement is adopted, when the rigid structure 10 is stressed and deformed, the force sensors located in the strain amplifying region 12 generate deformations and output signals through the corresponding bridge circuit, that is, two bridge circuits output signals, so that the direction and the magnitude of the acting force can be recognized by the signal processing circuit in which the output signals are received. The technical solutions of the present disclosure are described by multiple embodiments provided below.

Figure 4:
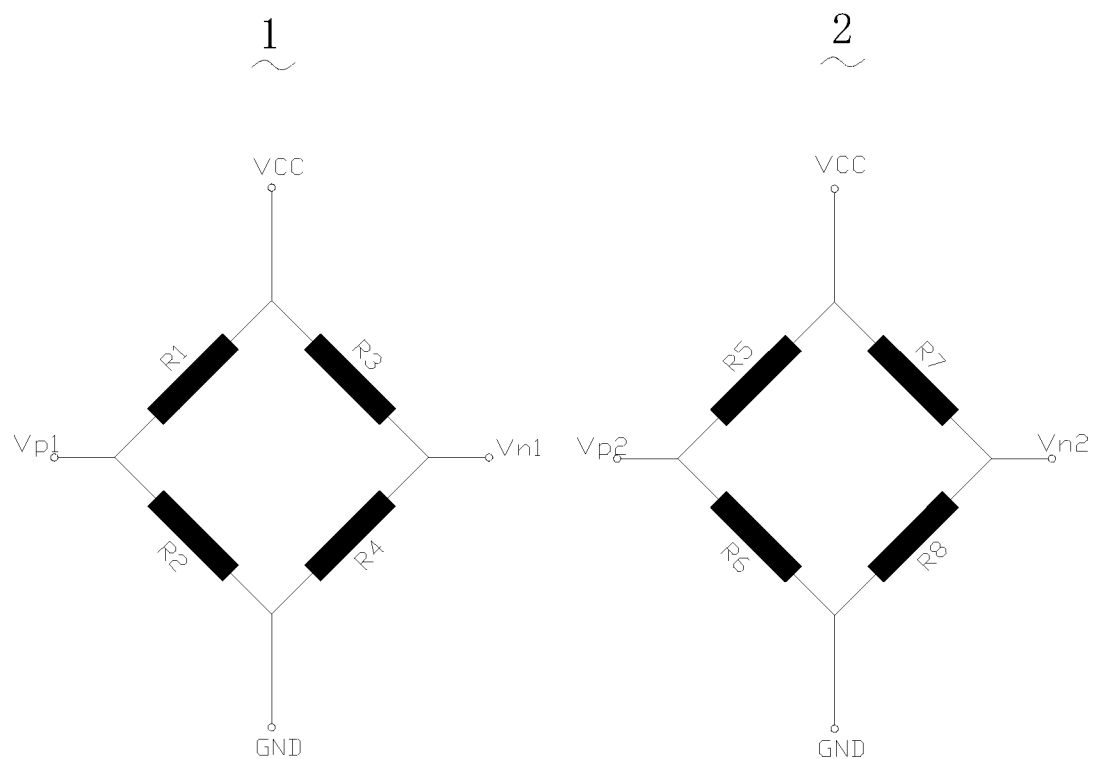
FIG. 4 is a schematic block diagram of a control component according to one embodiment of the present disclosure.

Embodiment One with reference to FIG. 3 and FIG. 4, a first bridge circuit and a second bridge circuit are configured, for the same first bridge circuit, two groups of opposite bridge arms R1, R4 and bridge arms R2, R3 of the first bridge circuit are respectively arranged on the first surface 10a and the second surface 10b of the strain amplifying region 12; for the same second bridge circuit, the two groups of opposite bridge arms R5, R8 and bridge arms R6, R7 of the second bridge circuit are respectively arranged on the first surface 10a and the second surface 10b of another strain amplifying region 12; when viewing from the Z-axis (up and down) direction, the force sensors R1, R4, R5 and R8 are laid on the same plane, and the force sensors R2, R3, R6 and R7 are laid on the same plane. When viewing from the Y-axis (front and rear) direction, the force sensors R1, R3, R8 and R6 are laid on the same plane, the force sensors R4, R2, R5 and R7 are laid on the same plane.

when $Vcc=Ui$, then, $Vp1=R2Ui/(R1+R2); Vn1=R4Ui/(R3+R4);$ $Vp2=R6Ui/(R5+R6); Vn2=R8Ui/(R7+R8);$ when $U1=Vp1-Vn1=(R2R3-R1R4)Ui/[(R1+R2)(R3+R4)];$ $U2=Vp2-Vn2=(R6R7-R5R8)Ui/[(R5+R6)(R7+R8)];$ $U3=Vp1-Vp2; U4=Vn1-Vn2; Ua=U3+U4;$ it is concluded that, $Ua=(Vp1+Vn1)-(Vp2+Vn2);$ When a force in a direction from the first surface 10a to the second surface 10b is acted on the object to be detected, the pressure sensing assembly may generate a bending deformation from top to bottom with the deformation of the object to be detected. Under the influence of curvature, the force sensors R2 and R3 will be stretched so that their respective lengths are lengthened, the force sensors R1 and R4 are squeezed so that their respective lengths are shortened, force sensors with features of increased resistances due to their lengthened lengths are taken as an example hereinafter. The resistances of the force sensors R2 and R3 will increase and their resistance change rates are approximate, and the resistances of the force sensors R1 and R4 will decrease and their resistance change rates are approximate; similarly, the resistances of the force sensors R6 and R7 will increase and their resistance change rates are approximate, and the resistances of the force sensors R5 and R8 will decrease and their resistance change rates are approximate.

when the object to be detected is pressed in a direction from top to bottom, $\Delta Vp1>0$, $\Delta Vn1<0$, $\Delta Vp2>0$, $\Delta Vn2<0$, $\Delta Vp2\approx-\Delta Vn2$.

$\Delta Vp1-\Delta Vn1>0; \Delta Vp2-\Delta Vn2>0; \Delta Vp1+\Delta Vn1\approx 0, \Delta Vp2+\Delta Vn2\approx 0.$ $\Delta U1>0; \Delta U2>0; \Delta Ua\approx 0.$ When a force in a direction from the second surface 10b to the first surface 10a is acted on the object to be detected, the pressure sensing assembly will generate a bending deformation from top to bottom with the deformation of the object to be detected. Under the influence of curvature, force sensors R2 and R3 are squeezed so that their respective lengths are shortened, and the force sensors R1 and R4 are stretched so that their respective lengths are lengthened. Similarly, the force sensors with features of increased resistances due to lengthened lengths are taken as an example, so that the resistances of the force sensors R2 and R3 will decrease and their resistance change rates are approximate, and the resistances of the force sensors R1 and R4 will increase and their resistance change rates are approximate. Similarly, the resistances of the force sensors R6 and R7 will decrease and their resistance change rates are approximate, and the resistances of the force sensors R5 and R8 will increase and their resistance change rates are approximate.

When the object to be detected is pressed in a direction from bottom to top, $\Delta Vp1<0$, $\Delta Vn1>0$, $\Delta Vp1\approx-\Delta Vn1$; $\Delta Vp2<0$, $\Delta Vn2>0$, $\Delta Vp2\approx-\Delta Vn2$.

$\Delta Vp1-\Delta Vn1<0; \Delta Vp2-\Delta Vn2<0; \Delta Vp1+\Delta Vn1\approx 0, \Delta Vp2+\Delta Vn2\approx 0.$ $\Delta U1<0; \Delta U2<0; \Delta Ua\approx 0.$ When a force in a direction from the third surface 10c to the fourth surface 10d is acted on the object to be detected, the pressure sensing assembly will generate a bending deformation from front to rear, the force sensors R4 and R2 will be stretched in the similar way to lengthen their respective lengths, the force sensors R1 and R3 will be squeezed in the similar way to shorten their respective lengths, that is, the resistances of the force sensors R4 and R2 are simultaneously increased and their resistance change rates are approximate, the resistances of the force sensors R1 and R3 are simultaneously decreased and their resistance change rates are approximate, similarly, the resistances of the force sensors R5 and R7 are simultaneously increased and their resistance change rates are approximate, and the resistances of the force sensors R6 and R8 will decrease and their resistance change rates are approximate.

When the object to be detected is pressed in a direction from front to rear, $\Delta Vp1>0$, $\Delta Vn1>0$, $\Delta Vp1\approx\Delta Vn1$; $\Delta Vp2<0$, $\Delta Vn2<0$, $\Delta Vp2\approx\Delta Vn2$.

$\Delta Vp1-\Delta Vn1\approx 0; \Delta Vp2-\Delta Vn2\approx 0; \Delta Vp1+\Delta Vn1>0, \Delta Vp2+\Delta Vn2<0. \Delta U1\approx 0; \Delta U2\approx 0; \Delta Ua>0.$ When a force in a direction from the fourth surface 10d to the third surface 10c is acted on the object to be detected, the pressure sensing assembly generates a bending deformation from front to rear, the force sensors R4 and R2 are squeezed in the similar way to shorten their respective lengths, the force sensors R1 and R3 are stretched in the similar way to lengthen their respective lengths, that is, the resistances of the force sensors R4 and R2 decrease simultaneously and their resistance change rates are approximate, and the resistances of the force sensors R1 and R3 increase simultaneously and their resistance change rates are approximate. Similarly, both the resistances of the force sensors R8 and R6 increase simultaneously and their resistance change rates are approximate, the resistances of the force sensors R5 and R7 decrease simultaneously and their resistance change rates are approximate.

When the object to be detected is pressed in a direction from back to front, $\Delta Vp1<0$, $\Delta Vn1<0$, $\Delta Vp1\approx\Delta Vn1$; $\Delta Vp2>0$, $\Delta Vn2>0$, $\Delta Vp2\approx\Delta Vn2$.

$\Delta Vp1-\Delta Vn1\approx 0; \Delta Vp2-\Delta Vn2\approx 0; \Delta Vp1+\Delta Vn1<0, \Delta Vp2+\Delta Vn2>0.$ $\Delta U1\approx 0; \Delta U2\approx 0; \Delta Ua<0.$ In conclusion, according to the pressure sensing assembly and the pressure sensing method disclosed in embodiment one, when the signal generating circuit 2 is the second bridge circuit, the force sensors of the first bridge circuit and the second bridge circuit are distributed on the first surface 10a and the second surface 10b, the output signal of the first bridge circuit is set as U1, the output signal of the second bridge circuit is set as U2, the potential difference between one detection terminal Vp1 of the first bridge circuit and one detection terminal Vp2 of the second bridge circuit is set as U3, the potential difference between the other detection terminal Vn1 of the first bridge circuit and the other detection terminal Vn2 of the second bridge circuit is set as U4, and the determination parameter is set as Ua, and the determination parameter meets a relational expression listed below:

$Ua=U3+U4$, so that, when U1 and U2 increase, it indicates that the force in the direction from the first surface 10a to the second surface 10b is acted on the object to be detected;

when U1 and U2 decrease, it indicates that the force in the direction from the second surface 10b to the first surface 10a is acted on the object to be detected;

when Ua increases, it indicates that the force in the direction from the third surface 10c to the fourth surface 10d is acted on the object to be detected;

When Ua decreases, it indicates that the force in the direction from the fourth surface 10d to the third surface 10c is acted on the object to be detected.

Therefore, according to the pressure sensing assembly disclosed in embodiment one, it only needs to collect signals of four channels (i.e., U1, U2, U3, U4) and converted the signals into signal features of U1, U2 and Ua, so that the pressure in the Z-axis direction or the Y-axis direction can be recognized, and the pressure value can be obtained, multi-dimensional detection is completed, and the calculation is simple. The pressure sensing assembly has the advantages of being small in noise, being small in drift of temperature and humidity, being high in sensitivity, being convenient to be assembled, and the like, in addition to being capable of detecting multi-dimensional deformation.

Embodiment Two

With reference to FIG. 2 and FIG. 4, the pressure sensing assembly in embodiment two has the same structure as the pressure sensing assembly in embodiment one, and the difference between the pressure sensing assembly in embodiment one and the pressure sensing assembly in embodiment two is embodied in how to obtain the determination parameter.

According to what disclosed above, when $U1=Vp1-Vn1=(R2R3-R1R4)Ui/[(R1+R2)(R3+R4)]$;

$U2=Vp2-Vn2=(R6R7-R5R8)Ui/[(R5+R6)(R7+R8)]$; $U3=Vp1-Vp2$;

$Ua=2U3+U2-U1$;

It can be concluded that, $Ua=(Vp1+Vn1)-(Vp2+Vn2)$;

The determination parameter Ua in the embodiment two and the determination parameter Ua in the embodiment one have the same value. When the pressure sensing assembly in embodiment two is used, signal changes of U1, U2 and U3 caused due to deformation of the object to be detected under the action of the acting force are the same as that in embodiment one, thus, the details are not repeatedly described herein.

According to the pressure sensing assembly and the pressure sensing method disclosed in the embodiment two, when the signal generating circuit 2 is the second bridge circuit, the force sensors of the first bridge circuit and the force sensors of the second bridge circuit are distributed on the first surface 10a and the second surface 10b respectively, the output signal of the first bridge circuit is set as U1, the output signal of the second bridge circuit is set as U2, the potential difference between one detection terminal Vp1 of the first bridge circuit and one detection terminal Vp2 of the second bridge circuit is set as U3, and the determination parameter is set as Ua, and the determination parameter meets the relational expression listed below:

$Ua=2U3+U2-U1$, then, when U1 and U2 increase, it indicates that a force in a direction from the first face 10a to the second face 10b is acted on the object to be detected;

when U1 and U2 decrease, it indicates that the force in the direction from the second surface 10b to the first surface 10a is acted on the object to be detected;

when Ua increases, it indicates that the force in the direction from the third surface 10c to the fourth surface 10d is acted on the object to be detected;

when Ua decreases, it indicates that a force in a direction from the fourth surface 10d to the third surface 10c is acted on the object to be detected.

Therefore, according to the pressure sensing assembly disclosed in embodiment two, it only needs to collect three channels of signals (i.e., U1, U2, U3) and convert these signals into signal features of U1, U2 and Ua, so that the pressure in the Z-axis direction or the Y-axis direction can be recognized and the pressure value can be obtained, multi-dimensional detection is completed, and calculation of the pressure value is simple.

Embodiment Three

Figure 5:
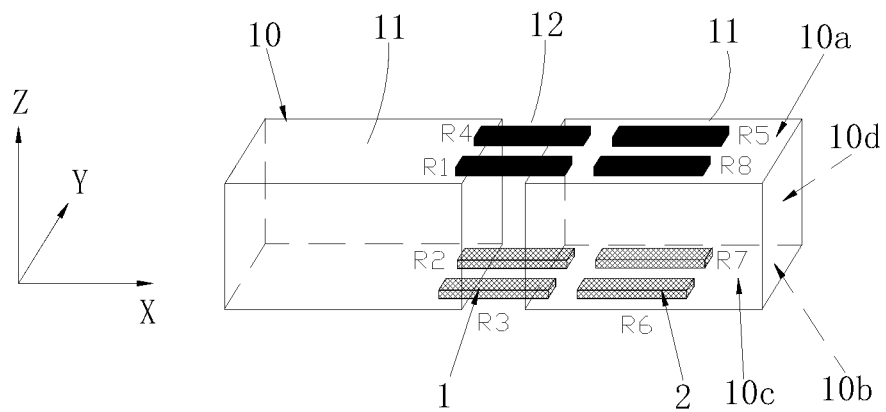
FIG. 5 is a circuit diagram of a bridge circuit of the pressure sensing assembly according to one embodiment of the present disclosure.

With reference to FIG. 4 and FIG. 5, the pressure sensing assembly in embodiment three differs from that of the embodiment one in that the force sensors R5, R8 and the force sensors R6, R7 of the second bridge circuit are arranged on the first surface 10a and the second surface 10b of the same rigid block 11, and the rigid block 11 is adjacent to the strain amplifying region 12 which is arranged to be adjacent to the first bridge circuit provided with the force sensors R1, R4 and the force sensors R2, R3, and the rigid blocks 11 on both sides are adjacent to the strain amplifying region 12, the force sensors R1, R4 and force sensors R2, R3 of the first bridge circuit correspond to the force sensors R8, R5 and the force sensors R7, R6 of the second bridge circuit in a one-to-one correspondence manner, the force sensors R1, R4 of the first bridge circuit and the force sensors R8, R5 of the second bridge circuit are noncolinear, the force sensors R2, R3 of the first bridge circuit and the force sensors R7, R6 of the second bridge circuit are noncolinear.

With reference to the pressure sensing method disclosed in embodiment three, reference can be made to the pressure sensing method disclosed in embodiment one or embodiment two, and the details are not repeatedly described herein. According to the pressure sensing assembly of embodiment three, the force sensors R5, R8 and the force sensors R6, R7 of the second bridge circuit are placed on the rigid block 11, the size of the pressure sensing assembly is optimized, and space occupation of the structure of the pressure sensing assembly is decreased.

Embodiment Four

Figure 6:
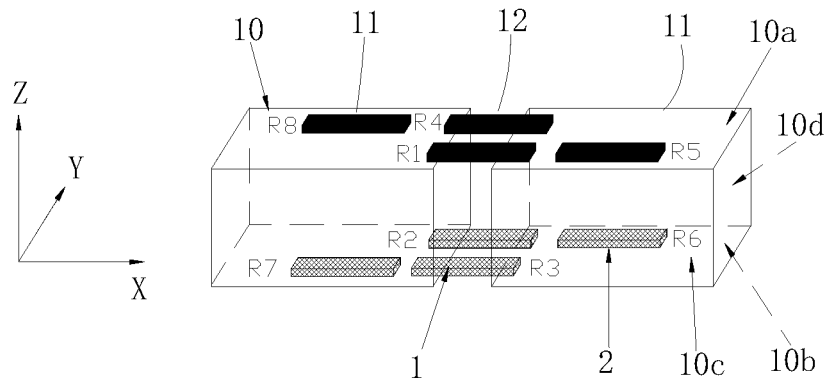
FIG. 6 is a three-dimensional structural diagram of the pressure sensing assembly according to another embodiment of the present disclosure.

With reference to FIG. 4 and FIG. 6, the pressure sensing assembly disclosed in embodiment four differs from that disclosed in embodiment three in that, the force sensors R5, R6 and the force sensors R7, R8 of the second bridge circuit are arranged between the first surface 10a and the second surface 10b of the two rigid blocks 11, the strain amplifying region 12 of the force sensors R1, R4 and force sensors R2, R3 of the first bridge circuit is arranged to be located between the two rigid blocks 11, the force sensors R1, R4 and the force sensors R2, R3 of the first bridge circuit correspond to the force sensors R5, R8 and the force sensors R6, R7 of the second bridge circuit in a one-to-one correspondence manner, the force sensors R1, R4 of the first bridge circuit and the force sensors R5, R8 of the second bridge circuit are noncolinear, the force sensors R2, R3 of the first bridge circuit and the force sensors R6, R7 of the second bridge circuit are noncolinear.

According to what disclosed above, when U1=Vp1−Vp2; U2=Vn1−Vn2;

$$Uz=U1-U3=(Vp1-Vn1)-(Vp2-Vn2);$$

$$Uy=U1+U3=(Vp1+Vn1)-(Vp2+Vn2);$$

when a force in a direction from the first surface 10a to the second surface 10b is acted on the object to be detected, the resistances of the force sensors R2 and R3 will increase and their resistance change rates are approximate, the force sensors R1 and R4 will decrease and their resistance change rates are approximate; the resistances of the force sensors R5, R6, R7 and R8 are almost unchanged.

$$\Delta Vp1>0, \Delta Vn1<0, \Delta Vp1\approx-\Delta Vn1; \Delta Vp2\approx\Delta Vn2\approx 0$$

$$\Delta Vp1-\Delta Vn1>0; \Delta Vp1+\Delta Vn1\approx 0; \Delta Vp2-\Delta Vn2\approx 0$$

$$\Delta Uz>0; \Delta Uy\approx 0.$$

When a force in a direction from the second surface 10b to the first surface 10a is acted on the object to be detected, the resistances of the force sensors R2 and R3 will decrease and their resistance change rates are approximate, the resistances of the force sensors R1 and R4 will increase and their resistance change rate are approximate; the resistances of the force sensors R5, R6, R7 and R8 are almost unchanged.

$$\Delta Vp1<0, \Delta Vn1>0, \Delta Vp1\approx-\Delta Vn1; \Delta Vp2\approx\Delta Vn2\approx 0$$

$$\Delta Vp1-\Delta Vn1<0; \Delta Vp1+\Delta Vn1\approx 0; \Delta Vp2-\Delta Vn2\approx 0$$

$$\Delta Uz<0; \Delta Uy\approx 0.$$

When a force in a direction from the third surface 10c to the fourth surface 10d is acted on the object to be detected, the resistances of the force sensors R1 and R3 decrease simultaneously and their resistance change rates are approximate, the resistances of the force sensors R2 and R4 increase simultaneously and their resistance change rates are approximate; the resistances of the force sensors R5, R6, R7 and R8 are almost unchanged.

$$\Delta Vp1>0, \Delta Vn1>0, \Delta Vp1\approx\Delta Vn1; \Delta Vp1\approx\Delta Vn2\approx 0;$$

$$\Delta Vp1-\Delta Vn1\approx 0; \Delta Vp1+\Delta Vn1>0; \Delta Vp2-\Delta Vn2\approx 0$$

$$\Delta Uz\approx 0; \Delta Uy>0.$$

When a force in a direction from the fourth surface 10d to the third surface 10c is acted on the object to be detected, the resistances of the force sensors R1 and R3 increase simultaneously and their resistance change rates are approximate, the resistances of the force sensors R2 and R4 decrease simultaneously and their resistance change rates are approximate; the resistances of the force sensors R5, R6, R7, and R8 are almost unchanged.

$$\Delta Vp1<0, \Delta Vn1<0, \Delta Vp1\approx\Delta Vn1; \Delta Vp2\approx\Delta Vn2\approx 0$$

$$\Delta Vp1-\Delta Vn1\approx 0; \Delta Vp1+\Delta Vn1<0; \Delta Vp2-\Delta Vn2\approx 0$$

$$\Delta Uz\approx 0, \Delta Uy<0.$$

According to the pressure sensing assembly and the pressure sensing method disclosed in embodiment four, when the signal generating circuit 2 is the second bridge circuit, the force sensors of the first bridge circuit and the force sensors of the second bridge circuit are distributed on the first surface 10a and the second surface 10b respectively, the output signal of the first bridge circuit is set as U1, the output signal of the second bridge circuit is set as U2, the two determination parameters are Uz and Uy respectively, and the two determination parameters meet the relational expression listed below:

$$Uz=U1-U3; Uy=U1+U3, \text{ then,}$$

when Uz increases, it indicates that a force in a direction from the first surface 10a to the second surface 10b is acted on the object to be detected;

when Uz decreases, it indicates that a force in a direction from the second surface 10b to the first surface 10a is acted on the object to be detected;

when Uy increases, it indicates that a force in a direction from the third surface 10c to the fourth surface 10d is acted on the object to be detected;

when Uy decreases, it indicates that a force in a direction from the fourth surface 10d to the third surface 10c is acted on the object to be detected;

Therefore, according to the pressure sensing assembly disclosed in embodiment four, it only needs to collect two channels of signals (U1, U3) and convert the signals into signal features of Uz and Uy, such that the pressure of the object to be detected in the Z-axis direction or the Y-axis direction can be recognized, the pressure value can be obtained, multi-dimensional detection is completed, and calculation of the pressure value is simple.

Embodiment Five

Figure 7:
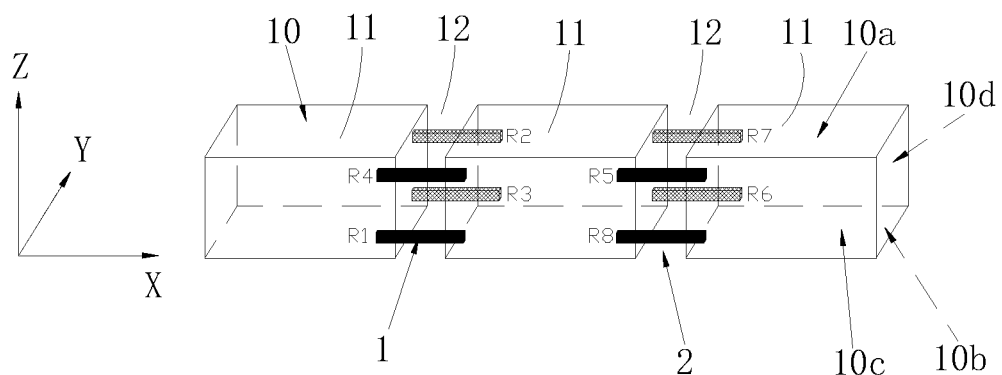
FIG. 7 is a three-dimensional structural diagram of the pressure sensing assembly according to another embodiment of the present disclosure.

With reference to FIG. 4 and FIG. 7, the pressure sensing assembly disclosed in embodiment five differs from the pressure sensing assembly disclosed in the embodiment one in that, for the same first bridge circuit, the two groups of opposite bridge arms R1, R4 and bridge arms R2, R3 of the first bridge circuit are respectively arranged on the third surface 10c and the fourth surface 10d of one strain amplifying region 12; for the same second bridge circuit, the two groups of opposite bridge arms R5, R8 and bridge arms R6, R7 are respectively arranged on the third surface 10c and the fourth surface 10d of another strain amplifying region 12.

setting $VCC=Ui$, then, $$Vp1=R2Ui/(R1+R2); Vn1=R4Ui/(R3+R4);$$

$$Vp2=R6Ui/(R5+R6); Vn2=R8Ui/(R7+R8);$$

setting $U1=Vp1-Vn1=(R2R3-R1R4)Ui/[(R1+R2)(R3+R4)];$ $$U2=Vp2-Vn2=(R6R7-R5R8)Ui/[(R5+R6)(R7+R8)];$$

$$U3=Vp1-Vp2; U4=Vn1-Vn2; Ua=U3+U4;$$

It can be concluded that, $Ua=(Vp1+Vn1)-(Vp2+Vn2)$;

According to what disclosed above, when the force in the direction from the third surface 10c to the fourth surface 10d is acted on the object to be detected, the resistances of the force sensors R2 and R3 will increase and their resistance change rates are approximate, the resistances of the force sensors R1 and R4 will decrease and their resistance change rates are approximate; the resistances of the force sensors R6 and R7 will increase and their resistance change rates are approximate, and the resistances of the force sensors R5 and R8 will decrease and their resistance change rates are approximate.

When the object to be detected is pressed in a direction from front to rear, $\Delta Vp1>0$, $\Delta Vn1<0$, $\Delta Vp1\approx-\Delta Vn1$; $\Delta Vp2>0$, $\Delta Vn2<0$, $\Delta Vp2\approx-\Delta Vn2$.

$$\Delta Vp1-\Delta Vn1>0; \Delta Vp2-\Delta Vn2>0; \Delta Vp1+\Delta Vn1\approx 0, \Delta Vp2+\Delta Vn2\approx 0.$$

$$\Delta U1>0; \Delta U2>0; \Delta Ua\approx 0.$$

When a force in a direction from the fourth surface 10d to the third surface 10c is acted on the object to be detected, the resistances of the force sensors R2 and R3 will decrease and their resistance change rates are approximate, the resistances of the force sensors R1 and R4 will increase and their resistance change rates are approximate; the resistances of the force sensors R6 and R7 will decrease and their resistance change rates are approximate, and the resistances of the force sensors R5 and R8 will increase and their resistance change rates are approximate.

When the object to be detected is pressed from back to front, $\Delta Vp1<0$, $\Delta Vn1>0$, $\Delta Vp1\approx-\Delta Vn1$; $\Delta Vp2<0$, $\Delta Vn2>0$, $\Delta Vp2\approx-\Delta Vn2$.

$$\Delta Vp1-\Delta Vn1<0; \Delta Vp2-\Delta Vn2<0; \Delta Vp1+\Delta Vn1\approx 0, \Delta Vp2+\Delta Vn2\approx 0.$$

$$\Delta U1<0; \Delta U2<0; \Delta Ua\approx 0.$$

When a force in a direction from the first surface 10a to the second surface 10b is acted on the object to be detected, the resistances of the force sensors R4 and R2 are simultaneously decreased and their resistance change rates are approximate, the resistances of the force sensors R1 and R3 increase simultaneously and their resistance change rates are approximate; the resistances of the force sensors R5 and R7 decrease simultaneously and their resistance change rates are approximate, the resistances of the force sensors R6 and R8 will increase simultaneously and their resistance change rates are approximate.

When the object to be detected is pressed in a direction from top to bottom, $\Delta Vp1<0$, $\Delta Vn1<0$, $\Delta Vp1\approx\Delta Vn1$; $\Delta Vp2>0$, $\Delta Vn2>0$, $\Delta Vp2\approx\Delta Vn2$.

$$\Delta Vp1-\Delta Vn1\approx 0; \Delta Vp2-\Delta Vn2\approx 0; \Delta Vp1+\Delta Vn1<0, \Delta Vp2+\Delta Vn2>0.$$

$$\Delta U1\approx 0; \Delta U2\approx 0; \Delta Ua<0.$$

When a force in a direction from the second surface 10b to the first surface 10a is acted on the object to be detected, the resistances of the force sensors R4 and R2 increase simultaneously and their resistance change rates are approximate, the resistances of the force sensors R1 and R3 decrease simultaneously and their resistance change rates are approximate; the resistances of the force sensors R5 and R7 increase simultaneously and their resistance change rates are approximate, the resistances of the force sensors R6 and R8 will decrease simultaneously and their resistance change rates are approximate.

When the object to be detected is pressed in a direction from bottom to top, $\Delta Vp1>0$, $\Delta Vn1>0$, $\Delta Vp1\approx\Delta Vn1$; $\Delta Vp2<0$, $\Delta Vn2<0$, $\Delta Vp2\approx\Delta Vn2$.

$$\Delta Vp1-\Delta Vn1\approx 0; \Delta Vp2-\Delta Vn2\approx 0; \Delta Vp1+\Delta Vn1>0, \Delta Vp2+\Delta Vn2<0.$$

$$\Delta U1\approx 0; \Delta U2\approx 0; \Delta Ua>0.$$

In conclusion, when the signal generating circuit 2 is the second bridge circuit, the force sensors of the first bridge circuit and the force sensors of the second bridge circuit are distributed on the third surface 10c and the fourth surface 10d respectively, the output signal of the first bridge circuit is set as U1, the output signal of the second bridge circuit is set as U2, the potential difference between one detection terminal Vp1 of the first bridge circuit and one detection terminal Vp2 of the second bridge circuit is set as U3, the potential difference between the other detection terminal Vn1 of the first bridge circuit and the other detection terminal Vn2 of the second bridge circuit is set as U4, and the determination parameter is set as Ua, the determination parameter meets the relational expression listed below:

$Ua=U3+U4$, then, when U1 and U2 increase, it indicates that the force in the direction from the third surface 10c to the fourth surface 10d is acted on the object to be detected;

when U1 and U2 decrease, it indicates that the force in the direction from the fourth surface 10d to the third surface 10c is acted on the object to be detected;

when Ua decreases, it indicates that the force in the direction from the first surface 10a to the second surface 10b is acted on the object to be detected;

When Ua increases, it indicates that the force in the direction from the second surface 10b to the first surface 10a is acted on the object to be detected;

Therefore, according to the pressure sensing assembly in the embodiment five, it only needs to collect the signals of four channels (U1, U2, U3, U4) and convert the signals into signal features of U1, U2 and Ua, such that the pressure in the Z-axis direction or the Y-axis direction acted on the object to be detected can be recognized and the pressure value can be obtained, multi-dimensional detection is completed and calculation of the pressure value is simple.

Embodiment Six

With reference to FIG. 4 and FIG. 7, the pressure sensing assembly in embodiment six and the pressure sensing assembly in embodiment five have the same structure, the differences between them lies in the method of obtaining the determination parameter.

According to what disclosed above, $U1=Vp1-Vn1=(R2R3-R1R4)Ui/[(R1+R2)(R3+R4)]$;

$U2=Vp2-Vn2=(R6R7-R5R8)Ui/[(R5+R6)(R7+R8)]$;
$U3=Vp1-Vp2; Ua=2U3+U2-U1$;

It can be concluded that, $Ua=(Vp1+Vn1)-(Vp2+Vn2)$;

The determination parameter Ua in embodiment six and the determination parameter Ua in embodiment five have the same value. When the pressure sensing assembly in embodiment six is used, the condition of signal variation of the U1, U2 and U3 caused due to deformation of the object to be detected is as same as that of embodiment five, and the details are not repeatedly described herein.

In the pressure sensing assembly and the pressure sensing method disclosed in embodiment six, when the signal generating circuit 2 is the second bridge circuit, the force sensors of the first bridge circuit and the force sensors of the second bridge circuit are distributed on the third surface 10c and the fourth surface 10d respectively, the output signal of the first bridge circuit is set as U1, the output signal of the second bridge circuit is set as U2, the potential difference between one detection terminal Vp1 of the first bridge circuit and one detection terminal Vp2 of the second bridge circuit is set as U3, and the determination parameter is Ua, the determination parameter meets the relational expression listed below:

$Ua=2U3+U2-U1$, then, when U1 and U2 increase, it indicates that the force in the direction from the third surface 10c to the fourth surface 10d is acted on the object to be detected;

when U1 and U2 decrease, it indicates that the force in the direction from the fourth surface 10d to the third surface 10c is acted on the object to be detected;

when Ua decreases, it indicates that the force in the direction from the first surface 10a to the second surface 10b is acted on the object to be detected;

when Ua increases, it indicates that the force in the direction from the second surface 10b to the first surface 10a is acted on the object to be detected;

Therefore, according to the pressure sensing assembly disclosed in embodiment six, it only needs to collect signals of three channels (U1, U2, U3) and convert these signals into signal features of U1, U2, and Ua, such that the pressure in the Z-axis direction or the Y-axis direction acted on the object to be detected can be recognized and the pressure value can be obtained, multi-dimensional detection is completed and calculation of the pressure value is simple.

Embodiment Seven

Figure 8:
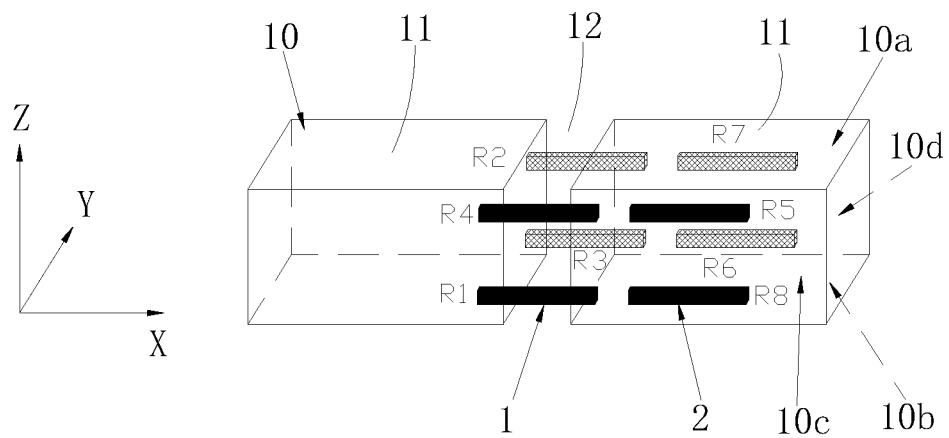
FIG. 8 is a three-dimensional structural diagram of the pressure sensing assembly according to another embodiment of the present disclosure.

With reference to FIG. 4 and FIG. 8, the pressure sensing assembly disclosed in embodiment seven differs from the pressure sensing assembly disclosed in embodiment five in that, the force sensors R5, R8 and the force sensors R6, R7 of the second bridge circuit are arranged on the third surface 10C and the fourth surface 10D of the rigid block 11, and the rigid block 11 is adjacent to the strain amplifying region 12 of the first bridge circuit which is provided with the force sensors R1, R4 and force sensors R2, R3, the rigid blocks 11 on both sides are adjacent to the strain amplifying region 12, the force sensors R1, R4 and the force sensors R2, R3 of the first bridge circuit correspond to the force sensors R8, R5 and the force sensors R7, R6 of the second bridge circuit, the force sensors R1, R4 of the first bridge circuit and the force sensors R8, R5 of the second bridge circuit are noncolinear, the force sensors R2, R3 of the first bridge circuit and the force sensors R7, R6 of the second bridge circuit are noncolinear.

Regarding the pressure sensing method disclosed in embodiment seven, reference can be made to the pressure sensing method disclosed in embodiment five or embodiment six, and the details of the pressure sensing method disclosed in embodiment seven are not repeatedly described herein. According to the pressure sensing assembly in embodiment seven, the force sensors R5, R8 and the force sensors R6, R7 of the second bridge circuit are placed on the rigid block 11, the size of the pressure sensing assembly is optimized, and space occupation of the structure is decreased.

Embodiment Eight

Figure 9:
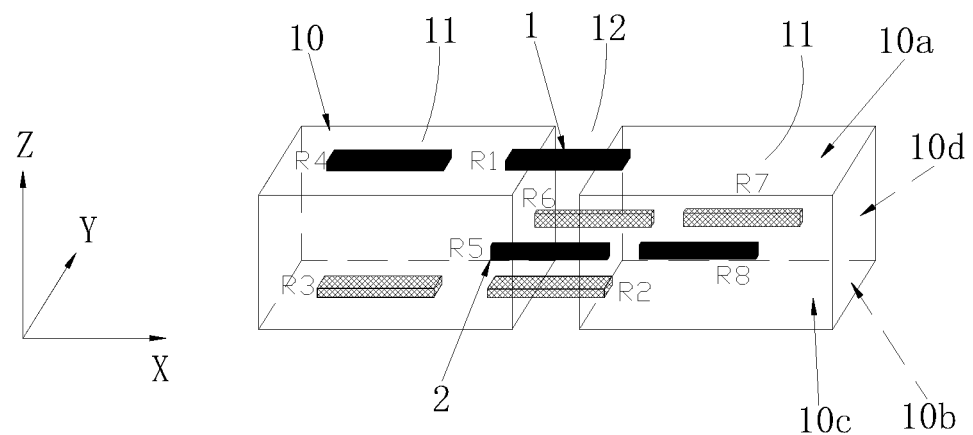
FIG. 9 is a three-dimensional structural diagram of the pressure sensing assembly according to another embodiment of the present disclosure.

With reference to FIG. 4 and FIG. 9, the first bridge circuit and the second bridge circuit are configured, for the same first bridge circuit, one group of opposite bridge arms R1 and R4 are respectively arranged at a central position of a first surface 10a of a strain amplifying region 12 and a first surface 10a of a rigid block 11 adjacent to the strain amplifying region 12, the other group of opposite bridge arms R2 and R3 are respectively arranged at a central position of a second surface 10b of the strain amplifying region 12 and a second surface 10b of the rigid block 11; for the same second bridge circuit, one group of opposite bridge arms R5 and R8 are respectively disposed at the central position of the third surface 10c of the strain amplifying region 12 and the third surface 10c of the rigid block 11 adjacent to the strain amplifying region 12, and the other group of opposite bridge arms R6 and R7 are respectively arranged at the central position of the fourth surface 10d of the strain amplifying region 12 and the fourth surface 10d of the rigid block 11.

Setting $VCC=Ui$, $Vp1=R2Ui/(R1+R2); Vn1=R4Ui/(R3+R4);$ $Vp2=R6Ui/(R5+R6); Vn2=R8Ui/(R7+R8);$ setting $U1=Vp1-Vn1=(R2R3-R1R4)Ui/[(R1+R2)(R3+R4)];$ $U2=Vp2-Vn2=(R6R7-R5R8)Ui/[(R5+R6)(R7+R8)];$ According to what disclosed above, when a force in a direction from the first surface 10a to the second surface 10b is acted on the object to be detected, the pressure sensing assembly is bent downwards, the first surface 10a is a curved inner surface, the force sensor R1 will be squeezed so that the resistance of the force sensor will be decreased; the second surface 10b is a curved outer surface, the force sensor R2 will be stretched so that the resistance of the force sensor R2 will be increased; the force sensors R5 and R6 are positioned at a center of curved surface, R5≈0, R6≈0, the force sensors R3, R4, R7 and R8 are arranged at the surface of the rigid block 11, and the rigid block 11 generates little deformation, so that the resistance value of the rigid block 11 is almost unchanged.

$\Delta Vp1>0, \Delta Vn1\approx 0; \Delta Vp2\approx 0, \Delta Vn2\approx 0.$ $\Delta U1>0; \Delta U2\approx 0.$ When a force in a direction from the second surface 10b to the first surface 10a is acted on the object to be detected, the pressure sensing assembly is bent upwards, the first surface 10a is a curved outer surface, and the force sensor R1 will be stretched so that the resistance of the force sensor R1 is increased; the second surface 10b is a curved inner surface, and the force sensor R2 will be squeezed so that the resistance of the force sensor R2 is decreased, the force sensors R5 and R6 are positioned at the center of a curved surface, R5 the force sensors R3, R4, R7 and R8 are arranged at the surface of the rigid block 11, and the rigid block 11 generates little deformation, so that the resistance value of the rigid block 11 is almost unchanged.

$\Delta Vp1<0, \Delta Vn1\approx 0; \Delta Vp2\approx 0, \Delta Vn2\approx 0.$ $\Delta U1<0; \Delta U2\approx 0.$ When a force in a direction from the third surface 10c to the fourth surface 10d is acted on the object to be detected, the pressure sensing assembly is bent backwards, the third surface 10c is a curved inner surface, the force sensor R5 will be squeezed so that the resistance of the force sensor R5 will be decreased; the fourth surface 10d is a curved outer surface, the force sensor R6 will be stretched so that the resistance of the force sensor R6 will be increased; the force sensors R1 and R2 are positioned at the center of curved surface, R1≈0, R2≈0, the force sensors R3, R4, R7 and R8 are arranged at the surface of the rigid block 11, and the rigid block 11 generates little deformation, so that the resistance value of the rigid block 11 is almost unchanged.

$\Delta Vp1\approx 0, \Delta Vn1\approx 0; \Delta Vp2>0, \Delta Vn2\approx 0.$ $\Delta U1\approx 0; \Delta U2>0.$ When a force in a direction from the fourth surface 10d to the third surface 10c is acted on the object to be detected, the pressure sensing assembly is bent forwards, the third surface 10c is a curved outer surface; the fourth surface 10d is the curved outer surface, the force sensor R6 will be stretched so that the resistance of the force sensor R6 will be increased; the force sensors R1 and R2 are positioned at the center of curved surface, the force sensors R3, R4, R7 and R8 are arranged at the surface of the rigid block 11, and the rigid block 11 generates little deformation, so that the resistance value of the rigid block 11 is almost unchanged.

$\Delta Vp1\approx 0, \Delta Vn1\approx 0; \Delta Vp2<0, \Delta Vn2\approx 0.$ $\Delta U1\approx 0; \Delta U2<0.$ In conclusion, when the signal generating circuit 2 is the second bridge circuit, the force sensors R1, R4 and the force sensors R2, R3 of the first bridge circuit are distributed at the center of the first surface 10A and the center of the second surface 10B, the force sensors R5, R8 and the force sensors R6, R7 of the second bridge circuit are distributed at the center of the third surface 10C and the center of the fourth surface 10D, the output signal of the first bridge circuit is set as U1, and the output signal of the second bridge circuit is set as U2, then, when U1 increases, the force in the direction from the first surface 10a to the second surface 10b is acted on the object to be detected;

when U1 decreases, the force in the direction from the second surface 10b to the first surface 10a is acted on the object to be detected;

when U2 increases, a force in a direction from the third surface 10c to the fourth surface 10d is acted on the object to be detected;

when U2 decreases, the force in the direction from the fourth surface 10d to the third surface 10c is acted on the object to be detected.

Therefore, according to the pressure sensing assembly disclosed in embodiment eight, it only needs to collect two channels of signals (U1, U2), and convert these signals into signal features of U1, U2, and Ua, such that the pressure in the Z-axis direction or the Y-axis direction acted on the object to be detected can be recognized and the pressure value can be obtained, multi-dimensional detection is completed and calculation of the pressure value is simple.

It can be understood that, when the first circuit arrangement is adopted, other arrangements may be used for the force sensors of the first bridge circuit and the force sensors of the second bridge circuit, as long as the first bridge circuit and the second bridge circuit can generate different output signals when the rigid structure 10 is stressed and deformed, the details are not repeatedly described herein.

When the second circuit arrangement is adopted, with reference to FIG. 3 and FIGS. 5-10, the first bridge circuit and the second bridge circuit can be configured, and there are various arrangements for the force sensors of the first bridge circuit and the force sensors of the second bridge circuit, reference can be made to the various arrangements for the force sensors in the first circuit arrangement. As shown in FIG. 10, the first circuit arrangement and the second circuit arrangement have in common that, two detection terminals Vp1 and Vn1 of the first bridge circuit are connected to constitute a first single bridge Vp3, two detection terminals Vp2 and Vn2 of the second bridge circuit are connected to constitute a second single bridge Vn3, the first single bridge Vp3 and the second single bridge Vn3 constitute a differential pair, and two groups of opposite bridge arms R5, R8 and bridge arms R6, R7 in the second bridge circuit are respectively arranged on two opposite mounting surfaces.

In a second circuit arrangement, when the rigid structure 10 is stressed and deformed, the force sensors located in the strain amplifying region 12 generate deformation, signals are output by the first bridge circuit and the second bridge circuit, and the signals are output by the first single bridge Vp3 and the second single bridge Vn3, and each path of signals is input into a signal processing circuit, so that the direction and the magnitude of the acting force is recognized. The details are described according to one embodiment set forth below.

Embodiment Nine

With reference to FIG. 3 and FIG. 10, the first bridge circuit and the second bridge circuit are configured, for the same first bridge circuit, two groups of opposite bridge arms R1, R4 and bridge arms R2, R3 of the first bridge circuit are respectively arranged on the first surface 10a and the second surface 10b of one strain amplifying region 12; for the same second bridge circuit, two groups of opposite bridge arms R5, R8 and bridge arms R6, R7 of the second bridge circuit are respectively arranged on the first surface 10a and the second surface 10b of another strain amplifying region 12.

setting $VCC=Ui$, then, $Vp1=R2Ui/(R1+R2); Vn1=R4Ui/(R3+R4)$;

$U1=Vp1-Vn1=(R2R3-R1R4)Ui/[(R1+R2)(R3+R4)]$;

When the two detection terminals Vp1, Vn1 of the first bridge circuit are separated, the resistances of the force sensors R1, R2, R3 and R4 are respectively solved, and it can be seen that U1 increases with the increase of the resistances of R2 and R3, and decreases with the increase of resistances of R1 and R4.

$Vp2=R6Ui/(R5+R6); Vn2=R8Ui/(R7+R8)$;

$U2=Vp2-Vn2=(R6R7-R5R8)Ui/[(R5+R6)(R7+R8)]$;

When the two detection terminals Vp2, Vn2 of the second bridge circuit are separated, the resistances of the force sensors R1, R2, R3, and R4 are resolved respectively, it can be seen that U2 increases with the increase of resistances of the force sensors R6 and R7, and decreases with the increase of resistances of the force sensors R5 and R8.

setting $U3=Vp3-Vn3$;

When the two detection terminals Vp1 and Vn1 of the first bridge circuit are connected, the force sensors R1 and R3 are connected in parallel, the force sensors R2 and R4 are connected in parallel, then, the force sensors R1 and R3 and the force sensors R2 and R4 are connected in serial to constitute the first single bridge Vp3; when two detection terminals Vp2 and Vn2 of the second bridge circuit are connected, the force sensors R5 and R7 are connected in parallel, the force sensors R6 and R8 are connected in parallel, then, the force sensors R5 and R7 and the force sensors R6 and R8 are connected in series to constitute the second single bridge Vn3.

According to what disclosed above, when a force in a direction from the first surface 10a to the second surface 10b is acted on the object to be detected, the resistances of the force sensors R2 and R3 will increase and their resistance change rates are approximate, and the resistances of the force sensors R1 and R4 will decrease and their resistance change rates are approximate, the resistances of the force sensors R6 and R7 will increase and their resistance change rates are approximate, and the resistances of the force sensors R5 and R8 will decrease and their resistance change rates are approximate.

When the object to be detected is pressed in a direction from top to bottom, $\Delta Vp1>0$, $\Delta Vn1<0$, $\Delta Vp1\approx-\Delta Vn1$, $\Delta Vp2>0$, $\Delta Vn2<0$, $\Delta V21\approx-\Delta Vn2$.

$U1=\Delta Vp1-\Delta Vn1>0; U2=\Delta Vp2-\Delta Vn2>0$.

Assuming that on-resistance of switches S1 and S2 are approximate to 0, then, $\Delta Vp3=(\Delta Vp1+\Delta Vn1)/2\approx0; \Delta Vn3=(\Delta Vp2+\Delta Vn2)/2\approx0$;

$U3=\Delta Vp3-\Delta Vn3\approx0$.

When a force in a direction from the second surface 10b to the first surface 10a is acted on the object to be detected, the resistances of the force sensors R2 and R3 will decrease and their resistance change rates are approximate, and resistances of the force sensors R1 and R4 will increase and their resistance change rates are approximate. The resistances of the force sensors R6 and R7 will decrease and their resistance change rates are approximate, and the resistances of the force sensors R5 and R8 will increase and their resistance change rates are approximate.

When the object to be detected is pressed in a direction from bottom to top, $\Delta Vp1<0$, $\Delta Vn1>0$, $\Delta Vp1\approx-\Delta Vn1$, $\Delta Vp2<0$, $\Delta Vn2>0$, $\Delta V21\approx-\Delta Vn$.

$U1=\Delta Vp1-\Delta Vn1<0; U2=\Delta Vp2-\Delta Vn2<0$.

Assuming that the on-resistance of the switches S1 and S2 are approximate to 0, then, $\Delta Vp3=(\Delta Vp1+\Delta Vn1)/2\approx0; \Delta Vn3=(\Delta Vp2+\Delta Vn2)/2\approx0$;

$U3=\Delta Vp3-\Delta Vn3\approx0$.

When a force in a direction from the third surface 10c to the fourth surface 10d is acted on the object to be detected, the resistances of the force sensors R4 and R2 increase simultaneously and their resistance change rates are approximate, the resistances of the force sensors R1 and R3 decrease simultaneously and their resistance change rates are approximate, the resistances of the force sensors R5 and R7 increase simultaneously and their resistance change rates are approximate, and the resistances of the force sensors R6 and R8 will decrease simultaneously and their resistance change rates are approximate.

When the object to be detected is pressed in a direction from front to rear, $\Delta Vp1>0$, $\Delta Vn1>0$, $\Delta Vp1\approx\Delta Vn1$, $\Delta Vp2<0$, $\Delta Vn2<0$, $\Delta V21\approx\Delta Vn2$.

$U1=\Delta Vp1-\Delta Vn1\approx0; U2=\Delta Vp2-\Delta Vn2\approx0$.

Assuming that the on-resistance of the switches S1 and S2 are approximate to 0, then, $\Delta Vp3=(\Delta Vp1+\Delta Vn1)/2>0; \Delta Vn3=(\Delta Vp2+\Delta Vn2)/2<0$;

$U3=\Delta Vp3-\Delta Vn3>0$.

When a force in a direction from the fourth surface 10d to the third surface 10c is acted on the object to be detected, the resistances of the force sensors R4 and R2 decrease simultaneously and their resistance change rates are approximate, the resistances of the force sensors R1 and R3 increase simultaneously and their resistance change rates are approximate. When the resistances of the force sensors R8 and R6 increase simultaneously and their resistance change rates are approximate, the resistances of the force sensors R5 and R7 decrease simultaneously and their resistance change rates are approximate.

When the object to be detected is pressed from back to front, $\Delta Vp1<0$, $\Delta Vn1<0$, $\Delta Vp1\approx\Delta Vn1$; $\Delta Vp2>0$, $\Delta Vn2>0$, $\Delta V21\approx\Delta Vn2$;

$$U1=\Delta Vp1-\Delta Vn1\approx0; U2=\Delta Vp2-\Delta Vn2\approx0.$$

Assuming that the on-resistances of switches S1 and S2 are approximate to 0, then, $$\Delta Vp3=(\Delta Vp1+\Delta Vn1)/2<0; \Delta Vn3=(\Delta Vp2+\Delta Vn2)/2>0;$$

$$U3=\Delta Vp3-\Delta Vn3<0.$$

In conclusion, according to the pressure sensing assembly and the pressure sensing method disclosed in embodiment nine, when the signal generating circuit 2 includes a second bridge circuit and a second single bridge Vn3, the force sensors of the first bridge circuit and the force sensors of the second bridge circuit are distributed on the first surface 10a and the second surface 10b, the output signal of the first bridge circuit is set as U1, the output signal of the second bridge circuit is set as U2, and the potential difference between the first single bridge Vp3 and the second single bridge Vn3 is U3, then,
- when U1 and U2 increase, it indicates that a force in a direction from the first face 10a to the second face 10b is acted on the object to be detected;
- when U1 and U2 decrease, it indicates that a force in a direction from the second surface 10b to the first surface 10a is acted on the object to be detected;
- when U3 increases, it indicates that the force in the direction from the third surface 10c to the fourth surface 10d is acted on the object to be detected;
- when U3 decreases, it indicates that the force in the direction from the fourth surface 10d to the third surface 10c is acted on the object to be detected;

Therefore, according to the pressure sensing assembly disclosed in embodiment nine, it only needs to collect signals of three channels (U1, U2, U3) and convert these signal into signal features of U1, U2 and Ua so as to recognize the pressure in the Z-axis or the Y-axis direction acted on the object to be detected and obtain the pressure value, multi-dimensional detection is completed and calculation of the pressure value is simple.

It can be understood that, when the second circuit arrangement is adopted, there are various arrangements for the force sensors of the first bridge circuit and the force sensors of the second bridge circuit, and various arrangements for the force sensors in the first circuit arrangement may also be used, the details are not repeatedly described herein.

When the third circuit arrangement is adopted, with reference to FIG. 11 and FIG. 12, the first bridge circuit and a path of fixed voltage may be configured, and there are various arrangement manners for the force sensors of the first bridge circuit, reference may be made to the various arrangements of the force sensors of the first bridge circuit in the first circuit arrangement. The third circuit arrangement and the first circuit arrangement have in common that the two detection terminals Vp1, Vn1 of the first bridge circuit are connected to constitute the first single bridge Vp3, the first single bridge Vp3 and the fixed voltages constitute a differential pair.

In a third circuit arrangement, when the rigid structure 10 is stressed and deformed, the force sensors located in the strain amplifying region 12 generate deformation and output signals through the first bridge circuit, and the signals are output by the first single bridge Vp3, and each path of signals are input into the signal processing circuit to recognize the direction and the magnitude of the acting force. This technical solution is described according to one embodiment provided below.

Embodiment Ten

Referring to FIG. 11 and FIG. 12, the first bridge circuit and a path of fixed voltage are configured, for the same first bridge circuit, the two groups of opposite bridge arms R1, R4 and bridge arms R2, R3 are respectively arranged on the first surface 10a and the second surface 10b of one strain amplifying region 12.

As compared to the pressure sensing method disclosed in embodiment nine, the pressure sensing method disclosed in embodiment ten differs from the pressure sensing method disclosed in embodiment nine in that: the second bridge circuit is not provided, so that there is no output signal U2 from the second bridge circuit, regarding the pressure sensing method in embodiment ten, reference can be made to embodiment nine without the consideration of the output signal U2, the details of the pressure sensing method in embodiment ten are not repeatedly described herein.

According to the pressure sensing assembly and the pressure sensing method disclosed in embodiment ten, when the signal generating circuit is a fixed voltage, the force sensors R1, R4 and the force sensors R2, R3 of the first bridge circuit are respectively distributed on the first surface 10a and the second surface 10b, the output signal of the first bridge circuit is set as U1, and the potential difference between the first single bridge Vp3 and the fixed voltage is set as U3, then, When U1 increases, it indicates that the force in the direction from the first surface 10a to the second surface 10b is acted on the object to be detected;

When U1 decreases, it indicates that the force in the direction from the second surface 10b to the first surface 10a is acted on the object to be detected;

When U3 increases, it indicates that the force from the third surface 10c to the fourth surface 10d is acted on the object to be detected;

When U3 decreases, it indicates that the force in the direction from the fourth surface 10d to the third surface 10c is acted on the object to be detected;

Therefore, according to the pressure sensing assembly disclosed in embodiment ten, it only needs to collect two channels of signals (U1, U3), such that the pressure in the Z-axis or the Y-axis direction and acted on the object to be detected can be recognized and the pressure value can be obtained, multi-dimensional detection is completed, and calculation of the pressure value is simple.

It can be understood that, when the third circuit arrangement is adopted, there are various arrangements for the force sensors of the first bridge circuits, and various arrangements of the force sensors of the first bridge circuit in the first circuit arrangement may also be used, the details of the third circuit arrangement are not repeatedly described here.

A pressure sensing method that applies the pressure sensing assembly is provided in some embodiments of the present disclosure, this pressure sensing method includes the following steps:
attaching a rigid structure 10 to a object to be detected;
With reference to FIGS. 3-9, when the signal generating circuit 2 is a second bridge circuit, electrically connecting a first bridge circuit and a second bridge circuit to a signal processing circuit, and recognizing a direction and a magnitude of an acting force by detecting signal changes of the first bridge circuit and the second bridge circuit;

With reference to FIG. 3, FIGS. 5-10, when the signal generating circuit 2 includes a second bridge circuit and a second single bridge Vn3, electrically connecting the first bridge circuit, the second bridge circuit, the first single bridge Vp3 and the second single bridge Vn3 to the signal processing circuit, and recognizing the direction and the magnitude of the acting force by detecting signal changes of the first bridge circuit, the second bridge circuit, the first single bridge Vp3 and the second single bridge Vn3;

With reference to FIG. 11 and FIG. 12, when the signal generating circuit is a fixed voltage, electrically connecting the first bridge circuit and the first single bridge Vp3 to the signal processing circuit, and recognizing the direction and the magnitude of the acting force by detecting signal changes of the first bridge circuit and the first single bridge Vp3.

During use, the rigid structure 10 is attached on the object to be detected, the object to be detected is stressed and deformed, the rigid structure 10 is deformed with the deformation of the object to be detected, the strain of the rigid structure 10 is concentrated in the strain amplifying region 12, the force sensors located at the strain amplifying region 12 obtain pressure signals, and the detection circuit 1 cooperates with the signal generating circuit 2 so as to generate different output signals which are input into the signal processing circuit, so that the direction and the magnitude of the acting force is recognized. The pressure sensing assembly has integrated structure, and is prone to be assembled, has a simple circuit configuration and is low in cost. According to the pressure sensing method, tiny deformations of the detected object in multi-dimensional direction can be detected very sensitively, so that pressures acted on the object to be detected in various directions can be accurately recognized, and the reliability and the stability of the pressure sensing assembly are improved.

A device including the aforesaid pressure sensing assembly is provided in some embodiments of the present disclosure. Since all technical solutions in all embodiments mentioned above are applied in this device, this device has all beneficial effects generated by the technical solutions of the embodiments mentioned above, the beneficial effects of this device are not repeatedly described here.

In another embodiment of the present invention, the object to be detected is a panel or a frame. The detection of the force acted on the panel or the frame is achieved. The panel or the frame may be made of a non-metallic material such as glass, plastic, ceramic, or the like. The panel may be a touch screen, a display, or other electronic terminal which is provided with the rigid structure 10. The frame may be a frame of one of various electronic terminal devices. By connecting force sensors with the panel or the frame, the magnitude of force touch can be accurately recognized, and application space for the electronic terminals in the aspect of product application, man-machine interaction and consumption experience is expanded. A user can directly obtain the level and the magnitude of acting force accurately by touching the touch screen, the display or the electronic terminal. After correction, a precise acting force can be obtained.

In the foregoing, only some selectable embodiments of the present disclosure are described, and these selectable embodiments are not intended to limit the present disclosure. It is obvious to the person of ordinary skill in the art that, various modifications and changes may be made in the present disclosure. Any modification, equivalent replacement, improvement, and the like, which are made within the spirit and the principle of the present disclosure, should all be included in the protection scope of the claims of the present disclosure.

What is claimed is:

1. A pressure sensing assembly, comprising:
    a rigid structure configured to be attached with an object to be detected and be deformed with deformation of the object to be detected, the rigid structure comprises a plurality of rigid blocks arranged at intervals along a X axis and a plurality of strain amplifying regions, wherein one strain amplifying region of the plurality of strain amplifying regions is formed between every two adjacent rigid blocks of the plurality of rigid blocks, and the rigid structure has four mounting surfaces;
    a detection circuit which comprises a first bridge circuit constituted by connecting at least four force sensors, wherein two groups of opposite bridge arms in the first bridge circuit are respectively arranged on two opposite mounting surfaces of the four mounting surfaces, and two force sensors are respectively arranged on two opposite mounting surfaces of the strain amplifying region; and
    a signal generating circuit configured to cooperate with the detection circuit so as to generate different output signals when the rigid structure is stressed and deformed, wherein the detection circuit and the signal generating circuit are electrically connected with a signal processing circuit to recognize a direction and a magnitude of an acting force.

2. The pressure sensing assembly according to claim 1, wherein the signal generating circuit is a second bridge circuit constituted by connecting at least four force sensors, and two groups of opposite bridge arms in the second bridge circuit are arranged on two opposite mounting surfaces of the four mounting surfaces, respectively; the first bridge circuit and the second bridge circuit generate different output signals when the rigid structure is stressed and deformed; or
    the detection circuit further comprises a first single bridge constituted by connecting two detection terminals of the first bridge circuit, the signal generating circuit comprises a second bridge circuit constituted by connecting at least four force sensors, and a second single bridge constituted by connecting two detection terminals of the second bridge circuit, wherein the first single bridge and the second single bridge form a differential pair, and the two opposite bridge arms in the second bridge circuit are arranged on the two opposite mounting surfaces of the four mounting surfaces; the first bridge circuit, the second bridge circuit, the first bridge and the second single bridge generate different output signals when the rigid structure is stressed and deformed; or
    the detection circuit further comprises a first single bridge constituted by connecting two detection terminals of the first bridge circuit, the signal generating circuit is a path of fixed voltage, and the first single bridge and the fixed voltage form a differential pair; and the first bridge circuit and the first single bridge can generate different output signals when the rigid structure is stressed and deformed.

3. The pressure sensing assembly according to claim 2, wherein a length direction of each of the four force sensors is parallel to the X axis; the four mounting surfaces are classified into a first surface and a second surface distributed at intervals on a Z axis, and a third surface and a fourth surface distributed at intervals on a Y axis, wherein the first surface is a fitting surface of the object to be detected, the X axis, the Y axis and the Z axis are perpendicular with respect to each other.

4. The pressure sensing assembly according to claim 3, wherein when the signal generating circuit is the second bridge circuit, the two groups of opposite bridge arms of the first bridge circuit are respectively arranged on the first surface and the second surface of the strain amplifying region; the two groups of opposite bridge arms of the second bridge circuit are respectively arranged on the first surface and the second surface of another strain amplifying region of the plurality of strain amplifying regions; or when the signal generating circuit is the second bridge circuit, the two groups of opposite bridge arms of the first bridge circuit are respectively arranged on the first surface and the second surface of the strain amplifying region; the two groups of opposite bridge arms of the second bridge circuit are respectively arranged on the first surface and the second surface of the rigid block adjacent to the strain amplifying region, and the four force sensors of the first bridge circuit and the four force sensors of the second bridge circuit are arranged in a one-to-one correspondence manner and are non-collinear; or when the signal generating circuit is the second bridge circuit, the two groups of opposite bridge arms of the first bridge circuit are respectively arranged on the third surface and the fourth surface of the strain amplifying region; the two groups of opposite bridge arms of the second bridge circuit are respectively arranged on the third surface and the fourth surface of another strain amplifying region of the plurality of strain amplifying regions; or when the signal generating circuit is the second bridge circuit, the two groups of opposite bridge arms of the first bridge circuit are respectively arranged on the third surface and the fourth surface of the strain amplifying region; the two groups of opposite bridge arms of the second bridge circuit are respectively arranged on the third surface and the fourth surface of the rigid block adjacent to the strain amplifying region, and the force sensor of the first bridge circuit and the force sensor of the second bridge circuit are located on different straight lines in a one-to-one correspondence manner; or when the signal generating circuit is the second bridge circuit, one group of opposite bridge arms of the first bridge circuit are respectively arranged at a central position of the first surface of the strain amplifying region and the first surface of the rigid block adjacent to the strain amplifying region, and the other group of opposite bridge arms of the first bridge circuit are arranged at a central position of the second surface of the strain amplifying region and the second surface of the rigid block adjacent to the strain amplifying region; one group of opposite bridge arms of the second bridge circuit are respectively arranged at a central position of the third surface of the strain amplifying region and the third surface of the rigid block adjacent to the strain amplifying region, and the other group of opposite bridge arms of the second bridge circuit are respectively arranged at a central position of the fourth surface of the strain amplifying region and the fourth surface of the rigid block adjacent to the strain amplifying region; or when the signal generating circuit is a path of fixed voltage, the two groups of opposite bridge arms of the first bridge circuit are respectively arranged on the first surface and the second surface of one strain amplifying region; or when the signal generating circuit is the path of fixed voltage, the two groups of opposite bridge arms of the first bridge circuit are respectively arranged on the third surface and the fourth surface of the strain amplifying region; or when the signal generating circuit is a path of fixed voltage, one group of opposite bridge arms of the first bridge circuit are respectively arranged at a central position of the first surface of the strain amplifying region and the first surface of the rigid block adjacent to the strain amplifying region, and the other group of opposite bridge arms of the first bridge circuit are respectively arranged at a central position of the second surface of the strain amplifying region and the second surface of the rigid block adjacent to the strain amplifying region; or when the signal generating circuit is the path of fixed voltage, one group of opposite bridge arms of the first bridge circuit is respectively arranged at a central position of the third surface of the strain amplifying region and the third surface of the rigid block adjacent to the strain amplifying region, and the other group of opposite bridge arms of the first bridge circuit are respectively arranged at a central position of the fourth surface of the strain amplifying region and the fourth surface of the rigid block adjacent to the strain amplifying region.

5. The pressure sensing assembly according to claim 2, wherein the two detection terminals of the first bridge circuit are connected through a first analog switch; and/or the two detection terminals of the second bridge circuit are connected through a second analog switch.

6. The pressure sensing assembly according to claim 2, wherein four flexible substrates are respectively arranged on the four mounting surfaces, and the four force sensors are respectively arranged on the four flexible substrates.

7. The pressure sensing assembly according to claim 6, wherein the four flexible substrates are formed by bending one base substrate.

8. The pressure sensing assembly according to claim 6, wherein the four flexible substrates are bonded with the four mounting surfaces by glue.

9. The pressure sensing assembly according to claim 2, wherein the force sensors are strain sensing resistors, and the strain sensing resistors are made of at least one material selected from a group consisting of a polycrystalline semiconductor material, an amorphous semiconductor material, a polysilicon, a graphene, a copper-nickel alloy, a carbon nanotube, a metal thin wire, and a conductive insulator composite material.

10. The pressure sensing assembly according to claim 1, wherein the rigid structure is one selected from a group consisting of a steel sheet, an aluminum sheet, a glass sheet, and an epoxide woven glass fabric laminated sheet.

11. A pressure sensing method which is applied to the pressure sensing assembly according to claim 1, and comprises following steps:

attaching the rigid structure on an object to be detected;

electrically connecting the first bridge circuit and the second bridge circuit to the signal processing circuit, and detecting a direction and a magnitude of an acting force by detecting signal changes of the first bridge circuit and the second bridge circuit, when the signal generating circuit is the second bridge circuit; or electrically connecting the first bridge circuit, the second bridge circuit, the first single bridge and the second single bridge to the signal processing circuit; or recognizing the direction and the magnitude of the acting force by detecting signal changes of the first bridge circuit, the second bridge circuit, the first single bridge and the second single bridge, when the signal generating circuit comprises the second bridge circuit and the second single bridge; or electrically connecting the first bridge circuit and the first single bridge to the signal processing circuit to recognize a direction and a magnitude of the acting force by detecting the variations of the signals of the first bridge circuit and the first single bridge, when the signal generating circuit is the path of fixed voltage.

12. The pressure sensing method according to claim 11, wherein when the signal generating circuit is the second bridge circuit, the force sensors of the first bridge circuit and the force sensors of the second bridge circuit are distributed on the first surface and the second surface respectively, an output signal of the first bridge circuit is set as U1, an output signal of the second bridge circuit is set as U2, a potential difference between one detection terminal of the first bridge circuit and one detection terminal of the second bridge circuit is set as U3, a potential difference between the other detection terminal of the first bridge circuit and the other detection terminal of the second bridge circuit is set as U4, and a determination parameter is set as Ua, when the determination parameter meets a following relational expression:

$Ua=U3+U4$, so that, when U1 and U2 increase, it indicates that a force in a direction from the first surface to the second surface is acted on the object to be detected;

when U1 and U2 decrease, it indicates that a force in a direction from the second surface to the first surface is acted on the object to be detected;

when Ua increases, it indicates that a force in a direction from the third surface to the fourth surface is acted on the object to be detected;

when Ua decreases, it indicates that a force in a direction from the fourth surface to the third surface is acted on the object to be detected; or when the signal generating circuit is the second bridge circuit, the force sensors of the first bridge circuit and the force sensors of the second bridge circuit are distributed on the first surface and the second surface, the output signal of the first bridge circuit is set as U1, the output signal of the second bridge circuit is set as U2, the potential difference between one detection terminal of the first bridge circuit and one detection terminal of the second bridge circuit is set as U3, the potential difference between the other detection terminal of the first bridge circuit and the other detection terminal of the second bridge circuit is set as U4, and the determination parameter is set as Ua, when the determination parameter meets a following relational expression:

$Ua=2U3+U2-U1$, then, when U1 and U2 increase, it indicates that the force in the direction from the first surface to the second surface is acted on the object to be detected;

when U1 and U2 decrease, it indicates that the force in the direction from the second surface to the first surface is acted on the object to be detected;

when Ua increases, it indicates that the force in the direction from the third surface to the fourth surface is acted on the object to be detected;

when Ua decreases, it indicates that the force in the direction from the fourth surface to the third surface is acted on the object to be detected; or when the signal generating circuit is the second bridge circuit, the force sensors of the first bridge circuit and the force sensors of the second bridge circuit are distributed on the first surface and the second surface respectively, the output signal of the first bridge circuit is set as U1, the output signal of the second bridge circuit is set as U2, and two determination parameters are set as Uz and Uy, and the two determination parameters meet the following relational expressions:

$Uz=U1-U3; Uy=U1+U3$, so that, when Uz increases, it indicates that the force in the direction from the first surface to the second surface is acted on the object to be detected;

when Uz decreases, it indicates that the force in the direction from the second surface to the first surface is acted on the object to be detected;

when Uy increases, it indicates that the force in the direction from the third surface to the fourth surface is acted on the object to be detected;

when Uy decreases, it indicates that the force in the direction from the fourth surface to the third surface is acted on the object to be detected; or when the signal generating circuit is the second bridge circuit, the force sensors of the first bridge circuit and the force sensors of the second bridge circuit are distributed on the third surface and the fourth surface respectively, the output signal of the first bridge circuit is set as U1, the output signal of the second bridge circuit is set as U2, the potential difference between one detection terminal of the first bridge circuit and one detection terminal of the second bridge circuit is set as U3, the potential difference between the other detection terminal of the first bridge circuit and the other detection terminal of the second bridge circuit is set as U4, and the determination parameter is set as Ua, the determination parameter meets the following relational expression:

$Ua=U3+U4$, so that, when U1 and U2 increase, it indicates that the force in the direction from the third surface to the fourth surface is acted on the object to be detected;

when U1 and U2 decrease, it indicates that the force in the direction from the fourth surface to the third surface is acted on the object to be detected;

when Ua decreases, it indicates that the force in the direction from the first surface to the second surface is acted on the object to be detected;

when Ua increases, it indicates that the force in the direction from the second surface to the first surface is acted on the object to be detected; or when the signal generating circuit is the second bridge circuit, the force sensors of the first bridge circuit and the force sensors of the second bridge circuit are distributed on the third surface and the fourth surface, the output signal of the first bridge circuit is set as U1, the output signal of the second bridge circuit is set as U2, the potential difference between one detection terminal of the first bridge circuit and one detection terminal of the second bridge circuit is set as U3, and the determination parameter is set as Ua, and the determination parameter meets the following relational expression:

$Ua=2U3+U2-U1$, so that, when U1 and U2 increase, it indicates that the force in the direction from the third surface to the fourth surface is acted on the object to be detected;
when U1 and U2 decrease, it indicates that the force in the direction from the fourth surface to the third surface is acted on the object to be detected;
when Ua decreases, it indicates that the force in the direction from the first surface to the second surface is acted on the object to be detected; or
when Ua increases, it indicates that the force in the direction from the second surface to the first surface is acted on the object to be detected;
when the signal generating circuit is the second bridge circuit, the force sensors of the first bridge circuit are distributed at a central position of the first surface and a central position of the second surface, the force sensors of the second bridge circuit are distributed at a central position of the third surface and a central position of the fourth surface, the output signal of the first bridge circuit is set as U1, and the output signal of the second bridge circuit is set as U2, so that,
when U1 increases, it indicates that the force in the direction from the first surface to the second surface is acted on the object to be detected;
when U1 decreases, it indicates that the force in the direction from the second surface to the first surface is acted on the object to be detected;
when U2 increases, it indicates that the force in the direction from the third surface to the fourth surface is acted on the object to be detected;
when U2 decreases, it indicates that the force in the direction from the fourth surface to the third surface is acted on the object to be detected.

13. The pressure sensing method according to claim 11, wherein when the signal generating circuit comprises the second bridge circuit and the second single bridge, the force sensors of the first bridge circuit and the force sensors of the second bridge circuit are distributed on the first surface and the second surface respectively, an output signal of the first bridge circuit is set as U1, an output signal of the second bridge circuit is set as U2, and a potential difference between the first single bridge and the second single bridge is set as U3, so that,
when U1 and U2 increase, it indicates that the force in the direction from the first surface to the second surface is acted on the object to be detected;
when U1 and U2 decrease, it indicates that the force in the direction from the second surface to the first surface is acted on the object to be detected;
when U3 increases, it indicates that the force in the direction from the third surface to the fourth surface is acted on the object to be detected;
when U3 decreases, it indicates that the force in the direction from the fourth surface to the third surface is acted on the object to be detected; or
when the signal generating circuit comprises the second bridge circuit and the second single bridge, the force sensors of the first bridge circuit and the force sensors of the second bridge circuit are distributed on the third surface and the fourth surface respectively, the output signal of the first bridge circuit is set as U1, the output signal of the second bridge circuit is set as U2, and the potential difference between the first single bridge and the second single bridge is set as U3, so that,
when U1 and U2 increase, it indicates that the force in the direction from the third surface to the fourth surface is acted on the object to be detected;
when U1 and U2 decrease, it indicates that the force in the direction from the fourth surface to the third surface is acted on the object to be detected;
when U3 increases, it indicates that the force in the direction from the first surface to the second surface is acted on the object to be detected;
when U3 decreases, it indicates that the force in the direction from the second surface to the first surface is acted on the object to be detected.

14. The pressure sensing method according to claim 11, wherein when the signal generating circuit is the path of fixed voltage, the force sensors of the first bridge circuit are distributed on the first surface and the second surface, the output signal of the first bridge circuit is set as U1, and a potential difference between the first single bridge and the fixed voltage is set as U3, so that,
when U1 increases, it indicates that the force in the direction from the first surface to the second surface is acted on the object to be detected;
when U1 decreases, it indicates that the force in the direction from the second surface to the first surface is acted on the object to be detected;
when U3 increases, it indicates that the force in the direction from the third surface to the fourth surface is acted on the object to be detected;
when U3 decreases, it indicates that the force in the direction from the fourth surface to the third surface is acted on the object to be detected; or
when the signal generating circuit is the path of fixed voltage, the force sensors of the first bridge circuit are distributed on the third surface and the fourth surface, the output signal of the first bridge circuit is set as U1, and the potential difference between the first single bridge and the fixed voltage is set as U3, so that,
when U1 increases, it indicates that the force in the direction from the third surface to the fourth surface is acted on the object to be detected;
when U1 decreases, it indicates that the force in the direction from the fourth surface to the third surface is acted on the object to be detected;
when U3 increases, it indicates that the force in the direction from the first surface to the second surface is acted on the object to be detected;
when U3 decreases, it indicates that the force in the direction from the second surface to the first surface is acted on the object to be detected.

15. A pressure detection device, comprising the pressure sensing assembly comprising:
a rigid structure configured to be attached with an object to be detected and be deformed with deformation of the object to be detected, the rigid structure comprises a plurality of rigid blocks arranged at intervals along a X axis and a plurality of strain amplifying regions, wherein one strain amplifying region of the plurality of strain amplifying regions is formed between every two adjacent rigid blocks of the plurality of rigid blocks, and the rigid structure has four mounting surfaces;
a detection circuit which comprises a first bridge circuit constituted by connecting at least four force sensors, wherein two groups of opposite bridge arms in the first bridge circuit are respectively arranged on two opposite mounting surfaces of the four mounting surfaces, and two force sensors are respectively arranged on two opposite mounting surfaces of the strain amplifying region; and a signal generating circuit configured to cooperate with the detection circuit so as to generate different output signals when the rigid structure is stressed and deformed, wherein the detection circuit and the signal generating circuit are electrically connected with a signal processing circuit to recognize a direction and a magnitude of an acting force.

16. The pressure detection device according to claim 15, wherein the signal generating circuit is a second bridge circuit constituted by connecting at least four force sensors, and two groups of opposite bridge arms in the second bridge circuit are arranged on two opposite mounting surfaces of the four mounting surfaces, respectively; the first bridge circuit and the second bridge circuit generate different output signals when the rigid structure is stressed and deformed; or the detection circuit further comprises a first single bridge constituted by connecting two detection terminals of the first bridge circuit, the signal generating circuit comprises a second bridge circuit constituted by connecting at least four force sensors, and a second single bridge constituted by connecting two detection terminals of the second bridge circuit, wherein the first single bridge and the second single bridge form a differential pair, and the two opposite bridge arms in the second bridge circuit are arranged on the two opposite mounting surfaces of the four mounting surfaces; the first bridge circuit, the second bridge circuit, the first bridge and the second single bridge generate different output signals when the rigid structure is stressed and deformed; or the detection circuit further comprises a first single bridge constituted by connecting two detection terminals of the first bridge circuit, the signal generating circuit is a path of fixed voltage, and the first single bridge and the fixed voltage form a differential pair; and the first bridge circuit and the first single bridge can generate different output signals when the rigid structure is stressed and deformed.

17. The pressure detection device according to claim 16, wherein a length direction of each of the four force sensors is parallel to the X axis; the four mounting surfaces are classified into a first surface and a second surface distributed at intervals on a Z axis, and a third surface and a fourth surface distributed at intervals on a Y axis, wherein the first surface is a fitting surface of the object to be detected, the X axis, the Y axis and the Z axis are perpendicular with respect to each other.

18. The pressure detection device according to claim 17, wherein when the signal generating circuit is the second bridge circuit, the two groups of opposite bridge arms of the first bridge circuit are respectively arranged on the first surface and the second surface of the strain amplifying region; the two groups of opposite bridge arms of the second bridge circuit are respectively arranged on the first surface and the second surface of another strain amplifying region of the plurality of strain amplifying regions; or when the signal generating circuit is the second bridge circuit, the two groups of opposite bridge arms of the first bridge circuit are respectively arranged on the first surface and the second surface of the strain amplifying region; the two groups of opposite bridge arms of the second bridge circuit are respectively arranged on the first surface and the second surface of the rigid block adjacent to the strain amplifying region, and the four force sensors of the first bridge circuit and the four force sensors of the second bridge circuit are arranged in a one-to-one correspondence manner and are non-collinear; or when the signal generating circuit is the second bridge circuit, the two groups of opposite bridge arms of the first bridge circuit are respectively arranged on the third surface and the fourth surface of the strain amplifying region; the two groups of opposite bridge arms of the second bridge circuit are respectively arranged on the third surface and the fourth surface of another strain amplifying region of the plurality of strain amplifying regions; or when the signal generating circuit is the second bridge circuit, the two groups of opposite bridge arms of the first bridge circuit are respectively arranged on the third surface and the fourth surface of the strain amplifying region; the two groups of opposite bridge arms of the second bridge circuit are respectively arranged on the third surface and the fourth surface of the rigid block adjacent to the strain amplifying region, and the force sensor of the first bridge circuit and the force sensor of the second bridge circuit are located on different straight lines in a one-to-one correspondence manner; or when the signal generating circuit is the second bridge circuit, one group of opposite bridge arms of the first bridge circuit are respectively arranged at a central position of the first surface of the strain amplifying region and the first surface of the rigid block adjacent to the strain amplifying region, and the other group of opposite bridge arms of the first bridge circuit are arranged at a central position of the second surface of the strain amplifying region and the second surface of the rigid block adjacent to the strain amplifying region; one group of opposite bridge arms of the second bridge circuit are respectively arranged at a central position of the third surface of the strain amplifying region and the third surface of the rigid block adjacent to the strain amplifying region, and the other group of opposite bridge arms of the second bridge circuit are respectively arranged at a central position of the fourth surface of the strain amplifying region and the fourth surface of the rigid block adjacent to the strain amplifying region; or when the signal generating circuit is a path of fixed voltage, the two groups of opposite bridge arms of the first bridge circuit are respectively arranged on the first surface and the second surface of one strain amplifying region; or when the signal generating circuit is the path of fixed voltage, the two groups of opposite bridge arms of the first bridge circuit are respectively arranged on the third surface and the fourth surface of the strain amplifying region; or when the signal generating circuit is a path of fixed voltage, one group of opposite bridge arms of the first bridge circuit are respectively arranged at a central position of the first surface of the strain amplifying region and the first surface of the rigid block adjacent to the strain amplifying region, and the other group of opposite bridge arms of the first bridge circuit are respectively arranged at a central position of the second surface of the strain amplifying region and the second surface of the rigid block adjacent to the strain amplifying region; or when the signal generating circuit is the path of fixed voltage, one group of opposite bridge arms of the first bridge circuit is respectively arranged at a central position of the third surface of the strain amplifying region and the third surface of the rigid block adjacent to the strain amplifying region, and the other group of opposite bridge arms of the first bridge circuit are respectively arranged at a central position of the fourth surface of the strain amplifying region and the fourth surface of the rigid block adjacent to the strain amplifying region.

19. The pressure detection device according to claim 17, wherein the two detection terminals of the first bridge circuit are connected through a first analog switch; and/or the two detection terminals of the second bridge circuit are connected through a second analog switch.

20. The pressure detection device according to claim 16, wherein four flexible substrates are respectively arranged on the four mounting surfaces, and the four force sensors are respectively arranged on the four flexible substrates.

* * * * *